(12) United States Patent
Koyama et al.

(10) Patent No.: US 6,964,796 B1
(45) Date of Patent: Nov. 15, 2005

(54) OXYGEN-ABSORBING RESIN COMPOSITION AND PACKAGING CONTAINER, PACKAGING MATERIAL, CAP OR LINER MATERIAL HAVING OXYGEN ABSORBABILITY

(75) Inventors: Masayasu Koyama, Zushi (JP); Masahito Kogure, Yokohama (JP); Yasuhiro Oda, Yokohama (JP); Yoshitsugu Maruhashi, Yokohama (JP); Toshio Goryoda, Yokohama (JP); Shogo Mukuno, Nakatsu (JP)

(73) Assignee: Toyo Seikan Kaisha, Ltd., Tokyo (JP)

(*) Notice: Subject to any disclaimer, the term of this patent is extended or adjusted under 35 U.S.C. 154(b) by 0 days.

(21) Appl. No.: 09/304,841

(22) Filed: May 5, 1999

Related U.S. Application Data

(63) Continuation-in-part of application No. 08/954,077, filed on Oct. 20, 1997, now abandoned.

(30) Foreign Application Priority Data

Oct. 18, 1996 (JP) .............................................. 8/275976
Apr. 1, 1999 (JP) ................................................ 9/95250

(51) Int. Cl.[7] .............................. B32B 1/02; B32B 29/00
(52) U.S. Cl. .................... 428/34.1; 428/36.6; 428/36.7; 428/35.3; 428/35.4; 428/34.3; 428/66.3; 428/402; 428/689
(58) Field of Search .............................. 428/36.6, 37.7, 428/35.3, 35.4, 34.3, 66.3, 402, 689

(56) References Cited

U.S. PATENT DOCUMENTS

| | | | |
|---|---|---|---|
| 5,089,323 A | 2/1992 | Nakae et al. | 428/220 |
| 5,153,038 A | * 10/1992 | Koyama et al. | 428/35.8 |
| 5,274,024 A | * 12/1993 | Koyama et al. | 524/440 |
| 4,518,674 A | 5/1995 | Watanabe et al. | 430/108 |
| 5,542,557 A | * 8/1996 | Koyama et al. | 215/347 |
| 5,744,056 A | 4/1998 | Venkateshwaran et al. | 252/188.28 |
| 5,908,676 A | * 6/1999 | Otaki et al. | 428/35.4 |

FOREIGN PATENT DOCUMENTS

| | | |
|---|---|---|
| EP | 0 367 390 A2 | 5/1990 |
| EP | 0 370 802 A1 | 5/1990 |
| EP | 0 688 666 A1 | 12/1995 |
| EP | 0 988 666 A1 | 12/1995 |
| EP | 0 818 505 A2 | 1/1998 |
| JP | 59085804 | * 5/1984 |

OTHER PUBLICATIONS

Database WPI Section Ch, Week 199219 Derwent Publications Ltd., London, GB; AN 1992–154545 XP002130806 & JP 04 090848 A (TTO Gosei Chem Ind Ltd), Mar. 24, 1992.
Patent Abstract of Japan vol. 016, No. 228 (c–0944), May 27, 1992.
European Search Report for EP 97 30 8281.

* cited by examiner

*Primary Examiner*—Harold Pyon
*Assistant Examiner*—Marc Patterson
(74) *Attorney, Agent, or Firm*—Sughrue Mion, PLLC

(57) ABSTRACT

A thermoplastic resin composition containing an oxygen-absorbing agent, wherein a resin matrix of the thermoplastic resin composition is substantially non-compatible and is composed of a blend of thermoplastic resins or elastomers, and the non-compatible thermoplastic resins and elastomers are present as a non-uniformly distributed structure in the resin matrix. The packaging container or cap of this invention suppresses the lowering of flavor retention incident to the dissolving out of the oxygen absorbing agent or its oxidation product even after retorting sterilization. The preservability of the contents and flavor retention can be achieved for a long period of time. According to a preferred embodiment, the oxygen absorbing speed can be increased. After storage for a long time, or after heat sterilization, a rugged state does not occur. There can be formed the oxygen-absorbing resin composition and the packaging container having excellent outer appearance.

9 Claims, 3 Drawing Sheets

OXYGEN-ABSORBING RESIN COMPOSITION AND PACKAGING CONTAINER, PACKAGING MATERIAL, CAP OR LINER MATERIAL HAVING OXYGEN ABSORBABILITY

CROSS-REFERENCES TO RELATED APPLICATION

This application is a continuation-in-part application of U.S. patent application Ser. No. 08/954,077, filed Oct. 20, 1997, now abandoned, in U.S. Patent Office.

BACKGROUND OF THE INVENTION (1) Field of the invention

This invention relates to an oxygen-absorbing resin composition and a packaging container, a packaging material, a cap or a liner material having oxygen absorbability. More particularly, it relates to an oxygen-absorbing resin composition having a non-uniform multilayer distributed structure in which the stress produced by volume expansion through an oxidation reaction of an oxygen absorbing agent can be alleviated within the resin composition and also relates to a packaging material, a packaging container, a cap, and a liner material for caps which have an oxygen-absorbability, and excellent preserbability of the contents.

(2) Prior art

Metal cans, glass bottles and various plastic containers have heretofore been used as packaging containers. Among them, plastic containers have been used in a variety of applications owing to their light weights, shock resistance and cost.

However, though no oxygen is permitted to permeate through the walls of the metal cans and glass bottles, oxygen permeates through the walls of the plastic containers to an extent that cannot be neglected, arousing a problem from the standpoint of preserving the contents.

In order to prevent this, the walls of the plastic containers are formed in a multi-layer structure and in which one layer is composed of a resin having resistance against the permeation of oxygen, such as ethylene/vinyl alcohol copolymer.

An oxygen-absorbing agent has long been used in order to remove oxygen in the container. An example of using the oxygen-absorbing agent in the container wall has been disclosed in Japanese Patent Publication No. 1824/1987, according to which a layer obtained by blending an oxygen permeable resin with an oxygen-absorbing agent comprising chiefly a reducing substance is laminated on a layer that does not permit the permeation of the oxygen gas, in order to realize a multi-layer structure for packaging.

The oxygen-absorbing agent of the iron type features a large oxygen-absorbing rate and a large oxygen-absorbing capacity, and is advantageous from the standpoint of cost. When iron and the compounds thereof elute out into the content, however, the content loses flavor though the amount of elution may be very small.

In order to prevent the iron-type oxygen-absorbing agent from eluting into the content, as disclosed in Japanese Laid-Open Patent Publication No. 114371/1998, means has been employed in which a resin layer without blended with the oxygen-absorbing agent is applied onto the inner and outer surfaces of the resin layer blended with the iron-type oxygen-absorbing agent in order to prevent the iron-type oxygen-absorbing agent from being exposed.

It was, however, learned that the elution of iron or a compound thereof into the content is not sufficiently prevented by simply applying a thermoplastic resin layer without blended with an oxygen-absorbing agent onto both sides of the thermoplastic resin layer that is blended with the iron-type oxygen-absorbing agent.

That is, the iron-type oxygen-absorbing agent in the layer remains completely covered with the thermoplastic resin layers that are not blended with the oxygen-absorbing agent within not long periods of time after the production of the multi-layer plastic containers. When the multi-layer plastic containers are preserved for extended periods of time, however, particles of the iron-type oxygen-absorbing agent penetrate through the thermoplastic resin coating layers and are exposed to the outside of the coating layers. As the particles penetrate through, the oxygen-absorbing agent elutes into the content to deteriorate the flavor in addition to the factor of oxygen.

This tendency is especially conspicuous in the case of retorting sterilization.

SUMMARY OF THE INVENTION

The present inventors have conducted keen study concerning the causes and have discovered the fact that in the oxygen-absorbing multi-layer plastic container after preserved for long periods of time, the particles comprising the oxygen-absorbing agent or the oxidized product thereof grow or increase the volume thereof due to the reaction of the iron-type oxygen-absorbing agent with oxygen, and penetrate through the thermoplastic resin protection layer and break the protection layer.

Therefore, the object of the present invention is to provide an oxygen absorbing resin composition in which another resin composition layer which is laminated with the layer of the resin composition of the present invention is not affected by volume expansion through a reaction of an oxygen absorbing agent with oxygen.

Another object of this invention has dissolved the above-mentioned defects in a conventional oxygen-absorbing multi-layer plastic container, controls the lowering of flavor retentivity which develops by the dissolving out of the oxygen-absorber or its oxidation product and can retain preservability of the contents and retentivity of flavor for long perids of time, and can provide a multi-layer plastic container, a packaging material, a plastic cap and a liner material for caps.

A further object of this invention provides an oxygen-absorbing multilayer plastic container, a plastic cap, a packaging material, and a liner material for caps which is even during preservation for a long period of time after retorting sterilization in which a thermoplastic resin coated layer provided on the layer composed of an oxygen-absorbing resin composition is maintained in a completely coated state.

A still further object of this invention is to control oxygen invading into the package through the wall almost completely and to provide an oxygen-absorbing packing material, especially in the case of a packaging container and a sealed closure, showing excellent preservability of the contents and flavor retaining property even when it is preserved for a long period time after retorting sterilization.

According to this invention, in a thermoplastic resin composition containing an oxygen absorbing agent, a resin matrix of the thermoplastic resin composition is composed of a plurality of blends of substantially non-compatible thermoplastic resins or elastomers, characterized in that the above non-compatible thermoplastic resins or elastomers are existent as a non-uniformly distributed structure in the resin matrix.

According to the present invention, it is desired that:

1. The non-uniformly distributed structure is a multi-layer structure;
2. Either the incompatible thermoplastic resins or the elastomers are propylene-type polymers and the other ones are ethylene-type polymers;
3. The blend is the one containing propylene-type polymers and ethylene-type polymers at a weight ratio of from 100:1 to 1:1 and, particularly, from 50:1 to 3:2;
4. The oxygen-absorbing agent is an iron-type oxygen-absorbing agent;
5. The oxygen-absorbing agent is blended in an amount of from 1 to 200% by weight and, particularly, from 3 to 60% by weight per the blend;
6. The oxygen-absorbing agent is oxygen-absorbing agent particles which comprise a reducing iron powder and an oxidation-promoting agent or a catalyst firmly adhered to surfaces of said reducing iron powder;
7. In the oxygen-absorbing agent mentioned in 6 above, the oxygen-absorbing agent particles having a specific surface area of not smaller than 0.5 $m^2/g$ and an apparent density of not larger than 2.2 g/cc, in which the oxidation-promoting agent or the catalyst is present in an amount of from 0.1 to 5% by weight per the reducing iron powder;
8. In the oxygen-absorbing agent particles mentioned in 6 above, the particles have a flat shape or a spindle shape and wherein the particles having an average particle diameter of from 10 to 50 gm as measured by the laser-scattering method and an aspect ratio (short axis size/long axis size) of not larger than 0.6 are present in an amount of not smaller than 50%, and the compression degree of the particles is not smaller than 20%; and
9. The oxygen-absorbing agent particles are obtained by dry-milling a reducing iron powder and a powder of an oxidation-promoting agent or a catalyst.

The resin matrix of the oxygen-absorbing resin composition is composed of a blend of a plurality of substantially non-compatible thermoplastic resins or elastomers and is characterized in that the above non-compatible theremoplastic resins or elastomers exist as a non-uniformly distributed structure in the resin matrix, especially as a multi-layer distributed structure, whereby volume expansion of particles by the reaction of the oxygen absorbing agent with oxygen is absorbed within the thermoplastic resin layer containing the oxygen absorbing agent, and the destruction of the thermoplastic resin layer containing the oxygen absorbing agent not containing the oxygen absorbing agent can be prevented.

The volume of the particles expand conspicuously upon the reaction of the oxygen-absorbing agent with oxygen. For example, when the particles of metal iron completely react with oxygen to form iron sesquioxide ($Fe_2O_3$), the volume expands by about 1.6 times provided iron has a density of 7.86 $g/cm^3$ and iron sesquioxide has a density of 5.1 $g/cm^3$. The resin matrix of a conventional resin layer containing oxygen-absorbing agent has a rigid structure, and the expansion of volume of the dispersed particles comprising the oxygen-absorbing agent or the ioxidized product thereof so works that the dispersed particles are expelled out of the resin matrix, i.e., that the dispersed particles penetrate through the coating resin layers and break them. In particular, the resin coating layer formed on the inner surface of the container has a small thickness so as to effectively absorb oxygen remaining in the container. Therefore, the resin coating layer is subject to be easily broken permitting the oxygen-absorbing agent to elute out into the content.

According to the present invention, on the other hand, the thermoplastic resin for dispersing the oxygen-absorbing agent is formed of a blend of a plurality of substantially incompatible thermoplastic resins or elastomers which form a nonuniformly distributed structure and, particularly, a multi-layer structure in the matrix. That is, when a blend of a plurality of substantially incompatible thermoplastic resins is melt-molded, a multi-layer structure is established in which the components are distributed like layers being laminated in the direction of the thickness and extending in the direction of the plane. In this matrix structure, when the volume of particles comprising the oxygen-absorbing agent or the oxidized product thereof is expanded, peeling takes place on the interfaces of the non-uniformly distributed structure and, particularly, of the multi-layer structure, and tiny voids (gaps) develop among the interfaces, whereby expansion of volume of the particles comprising the oxygen-absorbing agent or the oxidized product thereof is absorbed by the tiny voids, and the resin coating layers are not broken.

In the present invention, it is desired that either the incompatible thermoplastic resins or elastomers which are principal components are propylene-type polymers, and the other components (of small amounts) are ethylene-type polymers. This combination works excellently for separating the phases of general resins without adversely affecting the moldability of the resins or the mechanical properties. With this combination, furthermore, the ethylene-type polymers having lower melting points than the propylene-type polymers offer an advantage of forming a fine nonuniformly distributed structure.

In the present invention, the above layer composed of the oxygen-absorbing resin composition is included in the packing container, the packing material, the cap and the liner for caps whereby the preservability of the contents of these container and the like can be increased.

According to this invention, there is provided an oxygen-absorbing packing material composed of a laminated body composed of a polyolefin inner surface material/an oxygen-absorbing agent layer composed of a composition comprising polyolefin and an oxygen absorbing agent/a polyolefin buffering layer, a laminated body of an aluminum foil and a drawn nylon and/or a polyester, or an inorganic vapor-deposited plastic film are conjugated in a position relationship so that the aluminum foil or the inorganic vapor-deposited layer are opposed to the oxygen absorbing laminated body.

In this oxygen-absorbing packing material, by laminating a laminated body of aluminum foil and the drawn nylon and/or polyester, or an inorganic vapor-deposited plastic film which does not almost permeate oxygen to an outside of an oxygen-absorbing laminated body, whereby oxygen permeation from the outer portion of the packing material to the inside can be suppressed almost perfectly, and coupled with the presence of the oxygen-absorbing laminated body, the preservability of the contents can be increased.

DETAILED DESCRIPTION OF THE INVENTION

Oxygen-absorbing Resin Composition

Figure 1:
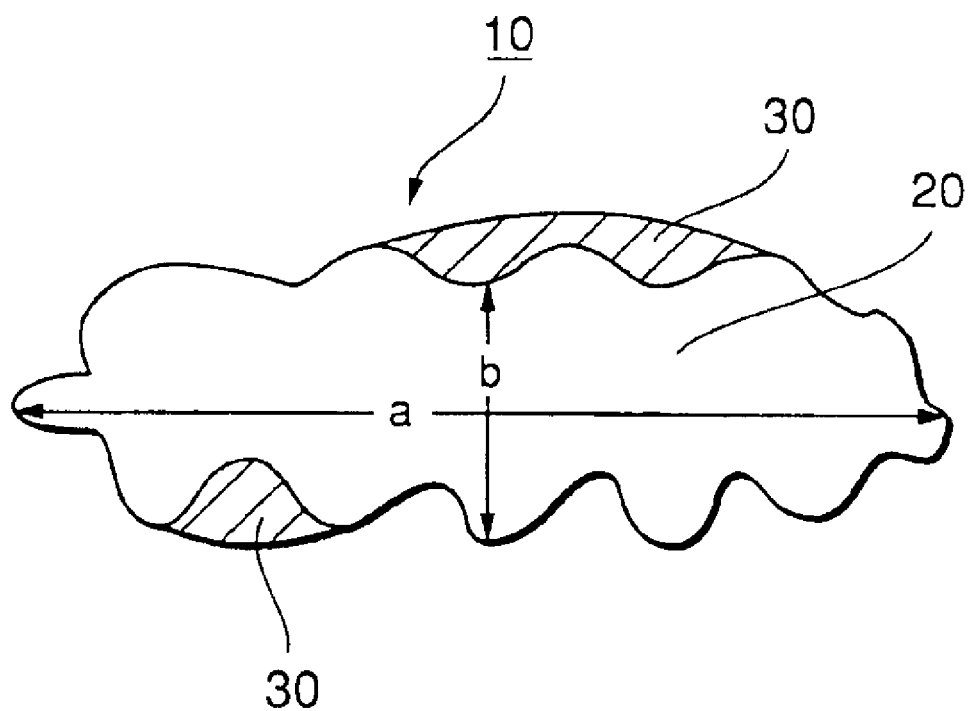
FIG. 1 is a sectional view of a schematic structure iof an oxygen-absorbing agent particle that is favorably used in the present invention.

The oxygen-absorbing resin composition of this invention is composed of a plurality of substantially non-compatible blends of thermoplastic resins and elastomers as a matrix, in which an oxygen absorbing agent is dispersed in the resin matrix.

[Oxygen-absorbing Agent]

As the oxygen-absorbing agent used in the present invention, any oxygen-absorbing agent can be used that has heretofore been used in this kind of applications. Generally, it is desired to dse a reducing oxygen-absorbing agent which is substantially insoluble in water. Suitable examples include reducing metal powders such as reducing iron, reducing zinc, and reducing tin powder; low-valent metal oxides such as ferrous oxide, tri-iron tetroxide as well as reducing metal compounds such as iron carbide, ferrosilicon, iron carbonyl and iron hydroxide, which may be used in one kind or in combination as a main component.

There can be further quoted high molecular compounds having a polyhydric phenol in the skeleton, such as polyhydric phenol-containing phenolaldehyde resin.

Furthermore, ascorbic acid, erythorbic acid and salts of these, or a combination of tocophenol and an electron donating substance; saccharides such as glucose, fructose, galactose, maltose and cellobiose and electron donating substance and especially a combination of basic substances and saccharide oxidizing enzymes; may be used.

It is desired that the oxygen-absorbing agent has a particle diameter of, usually, not larger than 100 $\mu$m and, particularly, not larger than 50 $\mu$m in average.

In the present invention, it is particularly desired to use an iron-type oxygen-absorbing agent having a large oxygen-absorbing rate and a large oxygen-absorbing capacity from the standpoint of effectively preventing off-flavor.

In order to promote the oxidation reaction of oxygen-absorbing particles, the oxygen-absorbing agent may be used in combination with the oxidation promotor or catalyst having water absorbing property. The oxidation promotor or catalyst may be used preferably in an amount of 0.1 to 10% by weight, especially 1 to 5% by weight per the oxygen absorbing agent. The oxygen promoting agent or catalyst may be used singly, or in a combination of plurality of members. For example, from the oxidation promotor or catalyst, an inorganic salt and a high molecular water-absorbing agent may be used in a combination of plurality of members.

When in this invention a reducing iron powder is used as the oxygen-absorbing particle, it is particularly preferred to use the oxidation promotor or catalyst in a state stuck to the surface of a reducing iron powder in a layer.

In this specification, the layer of the oxidation-promoting agent or the catalyst firmly adhered to surfaces of the reducing iron powder means not only that the oxidation-promoting agent or the catalyst is adhered to the surfaces of the reducing iron particles but also that the layer of the oxidation-promoting agent or the catalyst remains firmly adhered on the surfaces of the reducing iron powder without substantially being peeled off even under the condition of being kneaded together with the thermoplastic resin.

Referring to FIG. 1 schematically illustrating the structure of the oxygen-absorbing agent particles used in the present invention, a particle 10 comprises a core particle 20 of a reducing iron powder and a layer 30 of the oxidization-promoting agent or the catalyst firmly adhered to the surface thereof, the particle having a long axis size a and a short axis size b.

When the surfaces of the reducing iron powder are simply coated with the oxidation-promoting agent or the catalyst, the oxidation-promoting agent particles or the catalyst particles split off the surfaces of the reducing iron particles when being kneaded together with the thermoplastic resin, and the reducing iron free particles and the oxidation-promoting agent particles or the catalyst free particles are made present in the resin composition. This also occurs even when the oxidation promoting agent is applied to the iron powder using an aqueous solution, since the oxidation-promoting agents precipitate in the form of crystals. The oxidation-promoting agent or the catalyst in the resin composition absorbs the water that has permeated into the resin. However, since a distance is maintained relative to the reducing iron particles, the reducing iron powder is not quickly oxidized and the oxygen-absorbing rate becomes small. Besides, water concentrates in the portions of the oxidation-promoting agent particles or the catalyst particles, whereby the resin composition is swollen, and the outer surface of the container becomes rugged.

In the oxygen-absorbing agent particles preferably used in the present invention, on the other hand, the layer of the oxidation-promoting agent or the catalyst stably remain being firmly adhered to the surfaces of the reducing iron particles even after melt-kneaded together with the thermoplastic resin. Therefore, the water absorbed by the oxidation-promoting agent or the catalyst readily activates the reducing iron powder, whereby absorption of oxygen is promoted by the oxidizing reaction of iron and the oxygen-absorbing rate is maintained at a high level. Moreover, the appearance is prevented from being deteriorated by the occurrence of swelling and cracks caused by the water which concentrates in the portions of the oxidation-promoting agent or the catalyst.

In the embodiment of the invention, it is desired that the oxidation-promoting agent or the catalyst is present in an amount of from 0.1 to 5% by weight and, particularly, from 0.2 to 3.0% by weight per the reducing iron powder. When the amount of the oxidation-promoting agent or the catalyst is smaller than the above-mentioned range, the oxygen-absorbing rate becomes smaller than that of when the above-mentioned amount lies within the range of the present invention. When the above-mentioned amount is larger than the above-mentioned range, on the other hand, the resin composition as a whole loses resistance against the water and other properties, which is not desirable.

It is further desired that the oxygen-absorbing agent particles used in the present invention have a specific surface area of not smaller than 0.5 $m^2/g$ and an apparent density of not larger than 2.2 g/cc in addition to the above-mentioned constitution. When the specific surface area is not larger than 0.5 $m^2/g$ or when the apparent density is not smaller than 2.2 g/cc, the oxygen-absorbing rate decreases as will be exemplified later, and the amount of residual oxygen in the container becomes considerably larger than that of when above-mentioned specific areas and the apparent densities lie within the above-mentioned ranges. This is presumably due to that the resin composition blended with the oxygen-absorbing agent absorbs oxygen through the surfaces of the oxygen-absorbing agent particles, and oxygen is not effectively absorbed through the surfaces of the particles when the oxygen-absorbing agent particles have a specific surface area and an apparent density that lie outside the above-mentioned ranges.

It is desired that the oxygen-absorbing agent particles have a flat shape or a spindle shape having a compression degree (as measured by a method that will be described later) of not smaller than 20% and, particularly, from 30 to 90% and wherein not less than 50% of the particles have an average particle diameter of from 10 to 50 $\mu$m as measured by the laser-scattering method and an aspect ratio (short axis size/long axis size) of not larger than 0.6. The oxygen-absorbing agent particles having an average particle diameter within the above-mentioned range exhibits excellent dispersion in the thermoplastic resin and excellent oxygen-absorbing property. When use is made of the oxygen-absorbing agent particles having a compression degree of smaller than 20% or in which less than 50% of the particles have an aspect ratio of not larger than 0:6, the exhibited oxygen-absorbing performance is inferior to that of the oxygen-absorbing agent particles lying within the preferred range of the present invention, and the container exhibits inferior appearance. This is considered to be that decreasing the aspect ratio or increasing the compression degree, i.e., increasing the degree of flatness, makes it possible to increase the surface areas of the particles and, hence, to increase the oxygen-absorbing rate, to orient the oxygen-absorbing agent particles in the direction of melt-flow of the resin composition, i.e., in the direction of the layers, contributing to preventing id the swelling in the direction of the thickness and the occurrence of cracks.

The preferred oxygen-absorbing agent particles used in the present invention are in no way limited thereto only. Desirably, the oxygen-absorbing agent particles are obtained by dry-milling a reducing iron powder and a powder of the oxidation-promoting agent or the catalyst. In the dry-milling, the powder of the oxidation-promoting agent or the catalyst is milled and is rubbed against the surfaces of the reducing iron particles so as to form a layer that is firmly adhered thereto. The firmly adhered part is never accomplished by a conventional simple blending method or a method in which the reducing iron powder is mixed with an aqueous solution of the oxidation-promoting agent or the catalyst and is dried. In addition, the dry-milling accomplishes the actions of desirably adjusting the particle sizes of the reducing iron powder and controlling the flatness of the reducing iron particles to lie within the above-mentioned range.

The reducing iron powder is generally obtained by reducing an iron oxide (e.g., mill scale) formed in the step of producing a steel with coke, milling the formed sponge iron, followed by finish-reduction in a hydrogen gas or a cracked ammonia gas, electrolytically precipitating iron from an aqueous solution of iron chloride obtained through the step of washing with acid, followed by milling and finish-reduction. That is, iron oxides such as iron rust formed on the surfaces of the product in the step of producing a steel are relatively in a pure form, and iron chloride obtained by washing the iron rust with acid is in a pure form, too. Iron oxide is reduced by firing at a temperature of, generally, from about 600 to about 1200° C.

The production of reducing iron is not limited to reducing iron washed with acid by firing, but includes spraying molten iron into a nonoxidizing atmosphere, milling pure metal iron, and thermally decomposing iron carbonyl with water vapor, provided the starting iron is in a pure form.

The reducing iron powder should have properties lying within ranges mentioned above. To prevent the resin from being deteriorated and to improve flavor-retaining property, however, it is desired that copper is contained in an amount of not larger than 150 ppm and sulfur is contained in an amount of not larger than 500 ppm with respect to iron.

As the oxidation-promoting agent or the catalyst, there can be exemplified a water-soluble or deliquescent inorganic electrolyte. Concrete examples include inorganic salts such as sodium chloride, calcium chloride, zinc chloride, ferrous chloride, ferric chloride, ammonium chloride, ammonium sulfate, sodium sulfate, magnesium sulfate, disodium hydrogenphosphate, sodium diphosphate, potassium carbonate and sodium nitrate.

Among them, it is particularly desired to use a chloride and an iodide of an alkali metal or an alkaline earth metal and, particularly, sodium chloride, calcium chloride, ferric chloride, sodium iodide or potassium iodide. Use of a manganese salt such as manganese chloride ($MnCl_2$) or the like in addition thereto is effective in absorbing oxygen since the oxidation is promoted.

As the oxidation-promoting agent, there can be effectively used a water-soluble organic compound, such as glucose, fruit sugar, sucrose, gelatin, modified casein, modified starch, tragacanth gum, polyvinyl alcohol, CMC, sodium polyacrylate or sodium alginate. These organic oxidation-promoting agents or catalysts may be mixed into the thermoplastic resin in the form of oxygen-absorbing agent particles, or may be mixed into the resin separately from the oxygen-absorbing agent particles. In the present invention, it needs not be pointed out that a plurality of oxidation-promoting agents or catalysts can be used in combination.

In the present invention, the reducing iron powder and the oxidation-promoting agent or the catalyst are used in combination at a ratio as described above in detail. The oxidation-promoting agent or the catalyst is firmly adhered to the surfaces of the reducing iron powder by dry-milling the reducing iron powder and the powder of the oxidation-promoting agent or the catalyst. The end point of the dry-milling can be learned as the presence of the free solid particles of the oxidation-promoting agent or the catalyst become no longer confirmed through an electron microscope. As the dry-milling, there can be used such as vibration mill, ball mill, tube mill or super mixer. Though generally not required, the free fine powder of the oxidation-promoting agent or the catalyst can be removed, by sieving or by classification with wind power, from the oxygen-absorbing agent particles obtained after the dry-milling.

[Resin Matrix]

As the resin matrix for dispersing the oxygen-absorbing agent, there can be used a blend of a plurality of thermoplastic resins or elastomers which can be dispersed under the conditions of being melted but which are substantially incompatible.

Examples of the thermoplastic resin include olefin resin, thermoplastic polyester resin, polyamide resin, acrylic resin, styrene resin, vinyl resin and polycarbonate resin. These resins may have molecular weights large enough for forming a film. The resin to be ilk Sused in combination may be the one of the same kind or different kind so far as the above-mentioned conditions are satisfied.

A resin which can be easily blended with the oxygen-absorbing agent and permits the permeation of oxygen, is an olefin resin. As the olefin resin, there can be used a copolymer comprising chiefly olefins such as homopolymers of olefins like low-density polyethylene, medium-density polyethylene, high-density polyethylene, homopolypropylene, poly-1-butene, and poly-4-methyl-1-pentene, copolymers of olefins such as random or block copolymers of α-olefins like ethylene, propylene, 1-butene, 1-pentene, 1-hexene and 4-methyl-1-pentene, as well as ethylene-vinyl acetate copolymer, ethylene-(meth)acrylate copolymer, ionomer (ionically crosslinked olefin copolymer), ethylene-vinyl alcohol copolymer, and ethylene-vinyl chloride copolymer, in combination with other monomers as required.

Examples of the thermoplastic elastomer include ethylene-propylene rubber (EPR), ethylene-propylene-diene rubber (EPDM), thermoplastic elastomer such as styrene-butadiene-styrene block copolymer, styrene-isoprene-styrene block copolymer, styrene hydride-butadiene-styrene block copolymer, styrene hydride-isoprene-styrene block copolymer, hydrogenated butadiene-isoprene block copolymer, nitrile-butadiene rubber (NBR), styrene-butadiene rubber (SBR), chioroprene rubber (CR), polybutadiene (BR), polyisoprene (IIB), butyl rubber, natural rubber, thermoplastic polyurethane, silicone rubber and acrylic rubber. Among them, a hydrocarbon elastomer and, particularly, EPR and EPDM are preferred.

In the present invention, though there is no particular limitation, examples of the combination of incompatible thermoplastic resins or elastomers include propylene polymer/ethylene polymer, polyamide/olefin resin, polyamide/styrene resin, polyamide/ABS resin, polyethylene terephthalate/polybutene terephthalate, polycarbonate/polystyrene resin, polyester resin/olefin resin, and polycarbonate/polyester resin.

A combination of resins particularly suited for the object of the present invention is that of a crystalline propylene polymer and an ethylene polymer, facilitating the dispersion of the oxygen-absorbing agent and heat-molding. As the crystalline propylene polymer, there can be used a homopolypropylene as well as a random or a block copolymer containing ethylene in an amount of from 1 to 20% by weight and, particularly, from 2 to 15% by weight. These polypropylenes may have an isotactic structure or a syndiotactic structure.

Examples of the ethylene polymer include high-density polyethylene (HDPE), medium-density polyethylene (MDPE), low-density polyethylene (LDPE), linear low-density polyethylene (LLPDE), at least one copolymer of ethylene and other olefin such as propylene, butene-1, pentene-1, hexene-1, 4-methylpentene-1, octene-1, or decene-1, and ethylene/vinyl acetate copolymer, ethylene/acrylate copolymer, ionomer, etc.

The ratio of one resin and other resin in the resin matrix can be varied over a wide range and, desirably, from 100:1 to 1:1 and, particularly, from 50:1 to 3:2 on the weight basis.

In the present invention, it is allowable to use a compatibility-imparting agent to adjust the degree of dispersion of the resins or elastomers in the resin matrix. The compatibility-imparting agent works to enhance the mutual action among different polymers, and is a block copolymer or a graft copolymer having the same components as the polymers A, B to be blended, is a block copolymer or a graft copolymer having a third component to be mixed in the form of molecules into either one of the polymer A or B to be blended, or is a graft copolymer of two polymers compatible with either one of the polymer A or B to be blended.

When attention is given to the functions, the compatibility-imparting agents are grouped into two, i.e., compatibility-imparting agents of the non-reaction type and compatibility-imparting agents of the reaction type. Examples of the former compatibility-imparting agent include styrene-ethylene-butadiene block copolymer, polyethylene-methyl polymethacrylate block copolymer and polyethylene-polystyrene block copolymer. Examples of the latter compatibility-imparting agent include maleic anhydride-modified olefin resin and, particularly, maleic anhydride-grafted polypropylene and polyethylene, styrene-maleic anhydride copolymer, ethylene-glycidyl dimethacrylate copolymer, ethylene-acrylic ester-maleic anhydride copolymer, and styrene-glycidyl dimethacrylate copolymer.

These compatibility-imparting agents can be made present in the resin matrix in an amount of from 1 to 20% by weight and, particularly, from 2 to 10% by weight.

In the present invention, it is desired that the oxygen-absorbing agent is used at a concentration of from 1 to 200 parts by weight and, particularly, from 3 to 60 parts by weight per 100 parts by weight of the resin matrix. When the content of the oxygen-absorbing agent is lower than the above-mentioned range, it becomes difficult to suppress the oxygen concentration in the container to be smaller than the concentration suited for growing microorganisms. Even when the amount of the oxygen-absorbing agent is larger than the above-mentioned range, no distinguished effect is exhibited for lowering the oxygen concentration accompanied rather by disadvantages such as molding operation and cost.

The oxygen-absorbing agent and the resin matrix may be mixed together by either the so-called dry-blending or melt-blending. In order to favorably disperse the oxygen-absorbing agent, furthermore, a resin composition (master batch) containing the oxygen-absorbing agent at a high concentration may be prepared and may then be mixed into the resin matrix.

The above-mentioned oxygen-absorbing resin composition may form various laminated structures with other resin compositions such as a thermoplastic resin or an aluminum foil and used as a packaging material, a packaging container, a cap or a liner.

The laminated structures have an oxygen absorbing property by the presence of a layer composed of an oxygen-absorbing resin composition. Further, in such a laminated structure, it is preferred to form a sandwich structure by coating the oxygen-absorbing resin composition with a thermoplastic resin such as polyolefin. By this sandwich structure, the exposure of a surface of inner layer of the oxygen-absorbing particle is prevented. Especially, the cause of decline of a flavor by an iron transfer or an iron exposure at the period from the stage of production of packaging container, etc. or an early stage of packing can be effectively prevented.

The structure of a packaging container, a packaging material, a cap or a liner will be described.

[Packaging Containers]

Figure 2:
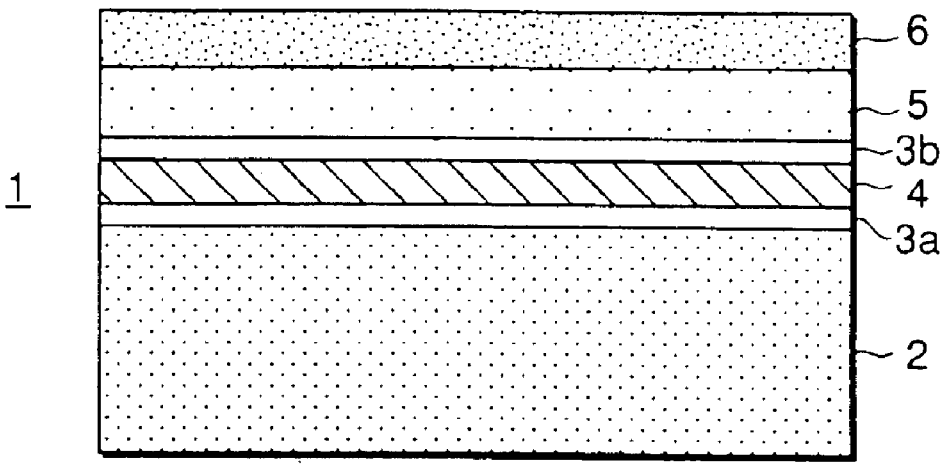
FIG. 2 is a sectional view of an example of the multi-layer structure of the container of this invention.

In FIG. 2 showing an example of multilayer of the container of this invention, a container wall 1 is composed of an outer layer 2 of a moisture-resistant thermoplastic resin, an adhesive resin layer 3a, a first intermediate layer 4 composed of a gas-barrier resin, an adhesive resin layer 3b, a second intermediate layer 5 composed of the above-mentioned oxygen-absorbing resin composition, and an inner layer 6 of the moisture-resistant thermoplastic resin. The second intermediate layer is composed of a thermoplastic resin layer in which an oxygen-absorbing agent is incorporated, and this thermoplastic resin is composed of a plurality of substantially non-compatible thermoplastic or elastomers. It shoud be noted that the second intermediate layer is provided inwardly of the gas-barrier resin layer 4.

Figure 3:
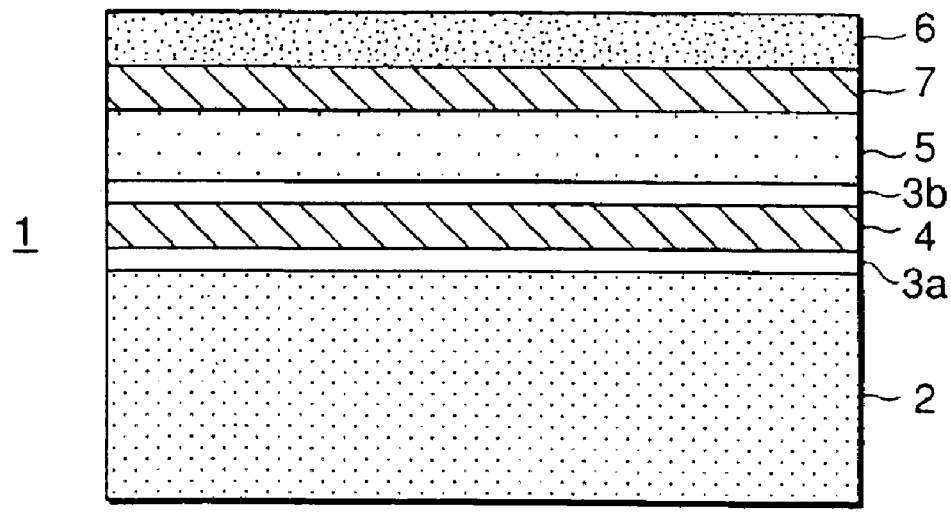
FIG. 3 is a sectional view of an example of the multi-layer structure of the container of this invention.

In FIG. 3 showing another example of the multilayer structure container of this invention, the container wall 1 is composed of the outer layer 2 of the moisture-resistant thermoplastic resin, the adhesive resin layer 3a, the first intermediate layer 4 composed of the gas-barrier resin, the adhesive resin layer 3b, the second intermediate layer 5 formed of the above-mentioned oxygen-absorbing resin composition, a third intermediate layer 7 composed of a resin composition containing an adsorptive deodorant, and an inner layer 6 of a moisture-resistant thermoplastic resin.

The oxygen-absorbing agent and the adsorptive deocorant are incorporated respectively in the second intermediate layer 5 and the third intermediate layer 7. It is understood that sequentially from the outside, the gas barrier resin layer 4, the oxygen-absorbing agent layer 5 and the adsorbent deodorant layer 7 are arranged.

(Thermoplastic Resin)

Suitable thermoplastic resin layers to be provided on both sides of the oxygen-absorbing resin composition in this invention are moisture-resistant resins (low water-absorbing resins), especially thermoplastic resins having a water absorption of 0.5% or below, especially 0.1% or below, measured by ASTM D570. Typical examples include low-, medium- or high-density polyethylene, isotactic polypropylene, ethylene-butene copolymer, polybutene-1, poly(4-methyl-1-pentene), ethylene-butene-1 copolymer, propylene-butene-1 copolymer, ethylene-propylene-butene-1 copolymer, random or block copolymer of α-olefins, ethylene-vinyl acetate copolymer, ion-crosslinked olefin copolymers (ionomers), or blends of olefin resins. Further examples include styrene resins such as lit-polystyrene, styrene-butadiene copolymers, styrene-isoprene copolymers and ABS resins and thermoplastic polyesters or polycarbonate such as polyethylene phthalate and polytetramethylene terephthalate.

Among these polymers, especially olefin resins may be preferably used. Since the olefin resins have a large oxygen permeation coefficient and excellent moisture resistance, oxygen in the container permeates and moves toward the oxygen absorbing agent via the olefin-type rein and this brings about an advantage that direct contact between water and the oxygen absorbing agent is shut off. This also brings about excellent sanitation. From the viewpoint of heat resistance, propylene-type resins are preferred. To incorporate a white pigment, especially titanium dixode in an inner material of a thermoplastic resin, it is effective to conceal coloration by an iron-type oxygen absorbing agent and it is also effective to prevent protrusion to an inside direction of iron oxide particles produced by an iron-type oxygen-absorbing agent. The compounded amount of titanium dioxide is not limited. But the suitable amount is 5 to 25 parts by weight per 100 parts by weight of the thermoplastic resin.

(Gas-barrier Resin)

As a gas-barrier resin used as required for the container of the present invention, there is used a heat-moldable thermoplastic resin having a low oxygen permeability. The most preferred example of the gas-barrier resin will be an ethylene-vinyl alcohol copolymer such as a saponified product of a copolymer obtained by saponifying an ethylene-vinyl acetate copolymer having an ethylene content of from 20 to 60 mol % and, particularly, from 25 to 50 mol % such that the degree of saponification becomes not smaller than 96 mol % and, particularly, not smaller than 99 mol %. It is desired that the saponified product of the ethylene-vinyl alcohol copolymer has a molecular weight large enough for forming a film and a viscosity of, generally, at least 0.01 dl/g and, particularly, at least 0.05 dl/g as measured in a mixture solvent of phenol and water at a weight ratio of 85:15 at a temperature of 30° C.

As another example of the gas-barrier resin having the above-mentioned properties, there can be used polyamides having amide groups in a number of from 5 to 50 and, particularly, from 6 to 20 per 100 carbon atoms, such as nylon 6, nylon 6,6, nylon 6/6, 6 copolymer, metaxylene adipamide, nylon 6, 10, nylon 11, nylon 12, and nylon 13. These polyamides, too, should have molecular weights large enough for forming films and a relative viscosity (72 rel) of at least 1.1 and, particularly, at least 1.5 as measured in concentrated sulfuric acid of a concentration of 1.0 g/dl at a temperature of 30° C.

The gas-barrier resin can be so provided as to neighbor the resin layer blended with the oxygen-absorbing agent as shown in FIG. 2.

(Adhesive Resin)

In laminating the layers, a sufficient degree of adhesiveness will not be often obtained between the gas-barrier resin and the moisture-resistant thermoplastic resin as in the case of the ethylene/vinyl alcohol copolymer. In this case, an adhesive resin layer is interposed between them.

As the adhesive resin, there can be exemplified a thermoplastic resin having carbonyl

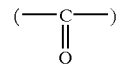

groups based on carboxylic acid, carboxylic anhydride, carboxylate, amide carboxylate or carboxylic ester in the main chain or in the side chain at a concentration of from 1 to 700 milliequivalent (meq)/100 g of the resin and, particularly, from 10 to 500 meq/100 g of the resin. Suitable examples of the adhesive resin include ethylene-acrylic acid copolymer, tonically crosslinked olefin copolymer, maleic anhydride-grafted polyethylene, maleic anhydride-grafted polypropylene, acrylic acid-grafted polyolefin, ethylene-vinyl acetate copolymer, copolymerized polyester and copolymerized polyamide, which may be used in one kind or in a combination of two or more kinds. These resins can be effectively laminated by the simultaneous extrusion or by sandwich lamination. Furthermore, a thermosetting adhesive resin of the isocyanate type or the epoxy type can be used for adhering the gas-barrier resin film that has been formed and the moisture-resistant resin film.

In the container of this invention, it is desirable that the oxygen-absorbing resin composition should have a thickness of generally 10 to 200 μm, especially 20 to 150 μm, although the above thickness varies depending upon the amount of oxygen allowed in the container or the shape of the container.

The moisture-resistant resin layer to be provided on both sides of the oxygen-absorbing resin composition has a thickness of generally 20 to 300 μm, especially 50 to 150 μm, and the should have a thickness of 0.1 to 30 times of the intermediate layer, especially 0.5 to 10 times of the intermediate layer. The inner layer and the outer layer may have the same thickness. Or it may have a larger thickness than the inner layer or the outer layer.

The thickness of the gas-barrier resin layer may preferably be generally 5 to 200 μm, especially 10 to 100 μm.

(Method of Production)

Except the above-mentioned layer constitution, the container of this invention can be produced by a method that has been known per se.

To simultaneously extrude many layers, the resin layers are melt-kneaded in the corresponding extruders, and are extruded into a predetermined shape through a multi-layer multiple die such as T-die or circular die. Furthermore, the resin layers are melt-kneaded in the corresponding extruder, co-extruded or successively extruded into an extrusion metal mold thereby to prepare a multi-layer container or a preform for the container. It is also allowable to employ a layer lamination system such as dry lamination, sandwich lamination or extrusion coating.

The molded article may assume the form of a film, a sheet, a parison or a pipe for forming bottle or tube, or a preform for forming bottle or tube. The bottle is easily formed from the parison, pipe or preform by pinching off the extruded product in a pair of split molds and blowing a fluid therein. Further, the pipe or preform is cooled and is, then, heated at a drawing temperature, drawn in the axial direction, and is blow-drawn in the circumferential direction utilizing the fluid pressure to obtain draw-blown bottles.

Furthermore, the film or the sheet is subjected to such means as vacuum molding, compressed-air molding, reverse draw forming or plug-assisted molding to obtain a packaging container in the form of a cup, tray, etc.

Furthermore, the multi-layer films can be overlapped or folded like a bag, followed by heat-sealing the periphery to obtain a bag-like container.

(Caps)

In the caps of this invention, the same layer constitution as in the packing container mentioned above, for example, the multilayer structure shown in FIGS. 2 and 3, may be employed.

In the caps of this invention, the oxygen-absorbing resin composition should have a thickness of generally 50 to 2000 $\mu$m, especially 100 to 150 $\mu$m.

The moisture-resistant resin layer to be provided on both sides of the oxygen-absorbing resin composition layer should have a thickness of generally 10 to 2000 $\mu$m, especially 50 to 1000 $\mu$m on the inner side, and generally 10 to 2000 $\mu$m, especially 50 to 1500 $\mu$m on the outside.

The thickness of the gas-barrier resin provided as required may preferably be generally 5 to 200 $\mu$m, especially 10 to 100 $\mu$m.

In the caps of this invention, known molding methods conventionally used in the molding of caps, such as injection molding, extrusion molding or compression molding, may be used.

As the moisture-resistant resin, the above-mentioned thermoplastic resins may be used. From the standpoint of hygienic property, olefin-type resins, especially polypropylene, may preferably be used.

In the caps of this invention, by known molding methods conventionally such as an in-shell molding method, a liner may be applied. An oxygen-permeable liner material may be applied so that the oxygen absorbing property of a layer composed of the oxygen-absorbing resin composition may not be impaired.

In the caps of this invention, it is of course possible to obtain the same effect as the packaging container. In the caps of this invention, oxygen barrier property of the caps can be increased, and the remaining oxygen in the head space of the container can be effectively absorbed, and the preservability of the contents can be increased.

(Liner Material)

The liner material for cap of this invention may be composed of a laminated body obtained by laminating a layer of the moisture-resistant resin on at least the inside of the oxygen-absorbing resin composition layer as a base and as desired, providing the moisture-resistant resin layer or the gas-barrier resin layer on the cap shell side. For example, the multilayer construction shown in FIG. 4 may preferably be employed.

Figure 4:
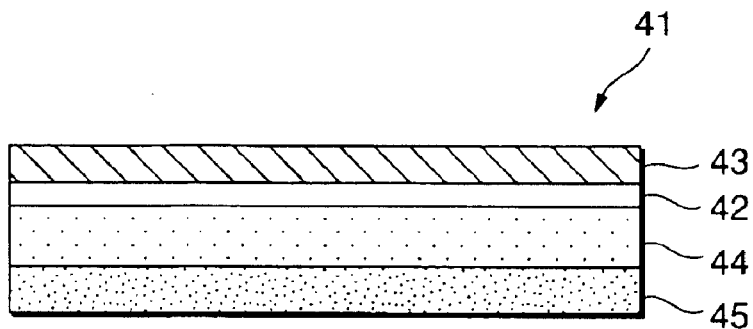
FIG. 4 is a sectional view of an example of the multi-layer structure of the liner material.

(1) In FIG. 4 showing one example of the layer construction of the liner material of this invention, the upper side denote a cap shell side and the lower denotes a container side. This liner material 41 is composed of a gas-barrier resin layer 43, an adhesive agent layer 42, an absorbing resin composition layer 44 and a moisture-resistant thermoplastic resin layer 45.

In the liner material of this invention, the oxygen-absorbing resin composition layer may preferably have a thickness of generally 10 to 2000 $\mu$m, especially 50 to 1000 $\mu$m.

The moisture-resistant resin layer to be provided at least on the inside of the oxygen-absorbing resin composition layer has a thickness of generally 5 to 200 $\mu$m, especially 10 to 150 $\mu$m. When it is provided on the outside layer side, it is preferred that the thickness of the moisture-resistant resin layer has a thickness of generally 5 to 200 $\mu$m, especially 10 to 150 $\mu$m. Preferably, the gas-barrier resin should have a thickness of generally 5 to 100 $\mu$m, especially 10 to 50 $\mu$m.

The liner material of this invention can be molded by any known molding method. For example, a desired laminated body may be molded by a conventionally known method such as a dry lamination method or an extrusion coating method, withdrawing the mold, providing the molded product in the cap shell by using an adhesive agent, or extruding a molten resin in the cap shell and compressing the extruded resin to form a liner by an in-shell mold method.

In the liner material of this invention, by using a layer composed of the same kind of resin as the material of the cap shell as a resin of the outside, the adhesiveness of the liner material on the cap shell is increased.

In the liner material of this invention, it is of course possible to obtain the same effect as the packing container. Since the liner material can absorb effectively the oxygen which enters into the inside of the container through the gap between the cap and the mouth portion of the container, the cap on which the liner material is applied makes it possible to effectively absorb the oxygen of the head space in the container in the same way as the cap of this invention, and the preservability of the contents can be increased.

(Packaging Material)

Figure 5:
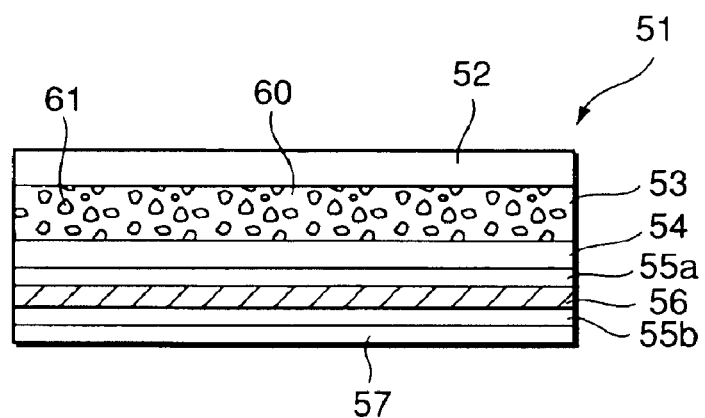
FIG. 5 is a sectional view of another example of the multi-layer structure of the packaging material of this invention.

In FIG. 5 showing one example of the oxygen-absorbing packing material of this invention, from an inner portion of the package toward an outside portion of the package, this packing material 51 is made of a laminated body composed of a polyolefin inner material layer 52, an oxygen-absorbing layer 53 composed of a polyolefin and an iron type oxygen-absorbing agent, a polyolefin buffering layer 54, an adhesive agent layer 55a, an aluminum foil 56, an adhesive layer 55b, and a laminated body made of a oriented nylon and/or a polyester outside layer 57.

Figure 6:
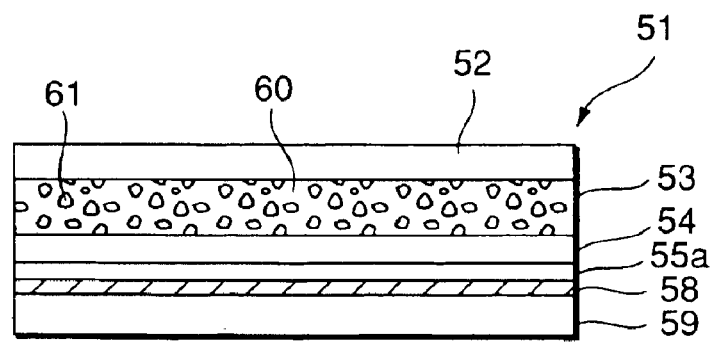
FIG. 6 is a sectional view of another example of the multi-layer structure of the packaging material of this invention.

In FIG. 6 showing another example of the oxygen-absorbing packaging material, this packing material 51 is made of a laminated body composed of a polyolefin inner surface material layer 52, an oxygen-absorbing layer 53 composed of a polyolefin and an iron type oxygen-absorbing agent, a polyolefin buffering layer 54, an adhesive agent layer 55a, an inorganic vapor-deposited layer 58 and an outside layer 59 of a plastic film.

In the packing material 51 of this invention, the oxygen-absorbing agent layer 53 composed of a polyolefin and an iron type oxygen-absorbing agent is sandwiched with a polyolefin inner surface material layer 52 and a polyolefin buffering layer 54. The outside surface layer of this polyolefin buffering layer 54 is adhered to an aluminum foil 56 protected with an outside layer 57 of a oriented nylon or polyester film, or an inorganic vapor-deposited plastic film 59 is pasted to an inorganic vapor-deposited layer 58 as an inner side.

According to this invention, in the oxygen-absorbing agent layer 53, the iron-type agent is present as a dispersed particle phase 65 in a continuous phase of the polyolefin, and the oxygen absorbing property naturally depends upon the iron-type oxygen absorbing agent 61.

The use of the iron-type oxygen absorbing particle 61 as a composition with the polyolefin 60 allows the oxygen absorbing agent particle 61 to be molded into a packaging material, and to prevent its dropping.

In the present invention, the oxygen absorbing agent layer 53 is sandwiched with the polyolefin inner surface material 52 and the polyolefin buffering layer 54. This sandwich structure prevents the iron-type oxygen absorbing agent particle from being exposed to the outside surface. Especially, it is effective to suppress the cause of reduction of flavor by iron exposure or iron transfer in the step of production of the packing material to an early stage of packing.

In the present invention, the oxygen-absorbing agent-containing resin composition layer 53 and the polyolefin layer 52 and 54 to sandwich the above layer may preferably be formed from polyolefins. This is because the polyolefins have a larger oxygen permeability and have excellent moisture resistance. According to this constitution of the packaging material, oxygen in the container permeates and moves toward the iron-type oxygen absorbing agent through the polyolefin. On the other hand, there is an advantage that direct contact between water and the iron-type oxygen-absorbing agent can be shut off.

Thus, in the packaging material of this invention oxygen absorption during retorting sterilization and in an early stage of preservation can be carried out very effectively.

To an outside of a laminated body composed of polyolefin inner material layer 52/oxygen-absorbing agent layer 53/polyolefin buffering layer 54, an aluminum foil 56 or an inorganic vapor-deposited layer 58 protected with an oriented plastic layer 57 is pasted in a position relationship in which the buffering layer 54 stands in opposition to the aluminum foil 57 or the inorganic vapor-deposited layer 58. If the aluminum foil 57 or the inorganic vapor-deposited layer 58 is in a complete condition, the oxygen permeation can be reduced substantially to zero through the container wall. That is to say, oxygen permeation occurs in an order which cannot be disregarded in the gas-barrier resin such as an ethylene vinyl alcohol copolymer. In contrast, in the aluminum foil or the inorganic vapor-deposited layer, oxygen permeation can be suppressed almost completely.

However, the aluminum foil or the inorganic vapor-deposited layer is weak to folding or bending or to protrusion, and pinholes or cracks occur and oxygen permeates from a portion of this injury. In this invention, a oriented nylon or polyester film is coated on the outside of the aluminum foil. Or in the case of an inorganic vapor-deposited plastic film, the inorganic vapor-deposited layer is made an inside-positioned material and the plastic film is made an outside-positioned material and by positioning a polyolefin buffering layer between the aluminum foil or the inorganic vapor-deposited plastic film and the oxygen-absorbing agent layer, the occurrence of pinholes or cracks in the aluminum foil or the inorganic vapor-deposited layer is prevented.

Since as mentioned above, the volume expansion of the particles by the reaction of the oxygen-absorbing agent with oxygen is very large, it is important to prevent oxygen permeation by providing the polyolefin buffering layer in an inside and an outside and preventing protrusion of the iron oxide particles toward the aluminum foil or the inorganic vapor-deposited plastic.

The oxygen absorbing agent-containing layer is formed of the above-mentioned oxygen-absorbing resin composition, a blend of substantially non-compatible thermoplastic resins and elastomers. In addition, the non-compatible thermoplastic resins or elastomers form a non-distributed structure in the matrix. Especially, they form a multilayer distributed structure. This is also effective to prevent the protrusion of the iron oxide particles inwardly or outwardly.

The thickness of the oxygen-absorbing agent-containing layer may preferably be 10 to 100 $\mu$m, especially 15 to 60 $\mu$m. If this thickness is lower than the above-mentioned range, the oxygen absorbing ability is insufficient. On the other hand, if the thickness is greater than the above range, the moldability becomes aggravated. The packing material tends to decrease flexibility and pliability.

The examples cited in the oxygen absorbing agent mentioned above may be used as the iron-type oxygen absorbing agent.

As the polyolefin inner surface material, the olefin-type resins cited as the aforesaid thermoplastic resins are used. From the standpoint of interlayer adhesiveness between the inner surface material and the oxygen-absorbing agent layer, it is desirable that the polyolefin as the inner surface material and the polyolefin as the oxygen-absorbing agent layer may be the same in kind. It is desirable for hiding coloration with the oxygen-absorbing agent that a white colored pigment, especially titanium dioxide, should be incorporated in the polyolefin inner surface material. The amount of titanium dioxide is not restricted in particular, but the suitable amount should be 5 to 25 parts by weight per 100 parts by weight of the polyolefin.

The thickness of the polyolefin inner surface material should be 5 to 50 $\mu$m, especially 10 to 30 $\mu$m. If this thickness is lower than the above-mentioned range, the iron oxide particles formed by the oxidation are protruded, and the flavor tends to be lowered. On the other hand, if the thickness is above the above range, the oxygen absorbability tends to be reduced.

As the polyolefin buffering layer, the olefin-type resins cited in the above thermoplastic resins may be used. From the standpoint of interlayer adhesiveness between the buffering layer and the oxygen-absorbing layer, the polyolefin in the buffering layer should be the same as the polyolefin in the oxygen-absorbing agent layer.

The thickness of the polyolefin buffering layer may be 5 to 50 $\mu$m, especially 10 to 30 $\mu$m. If the thickness is lower than the above-mentioned range, the iron oxide particles produced by the oxidation causes protrusion to the aluminum foil, and the oxygen shutting off property tends to be reduced on the other hand, if the thickness is above the above-mentioned range, the moldability tends to be aggravated, and flexibility and pliability as the packing material tends to be reduced.

[Aluminum Foil]

All aluminum foils used in packing of this type may be used as the aluminum foils. For example, pure aluminum or aluminum and other alloying metals, especially aluminum alloys containing a small amount of magnesium or manganese, may be used. These aluminum foils may be any of generally called soft, hard and half-hard.

The thickness of the aluminum foils may preferably be in the range of 5 to 50 $\mu$m, especially 7 to 20 $\mu$m. If this thickness is lower than the above-mentioned range, the oxygen shut off property tends to become insufficient. On the other hand, if the thickness is larger than the above-mentioned range, flexibility and pliability as the packing material tends to be reduced.

[Oriented Film Layers]

Examples of the nylon film (Ny) used to protect the aluminum foils include nylon 6, nylon 6,6, nylon 6/6, 6 copolymer, nylon 10, nylon 12 or blends of these nylons.

As the polyester films, examples include polyethylene terephthalate (PET), polybutylene terephthalate (PBT), polyethylene naphthalate (PEN) and blends of these polyesters.

These films are preferably stretched in a monoaxial direction, best stretched in two directions.

The oriented film is required to be provided on an outside of the aluminum foil (Al), but may also be formed on an inner side of the aluminum foil.

Suitable examples of lamination constitution include Al/PET, Al/Ny, Al/Ny/PET, and Ny/Al/PET.

The thickness of the oriented film layer may be 5 to 50 $\mu$m, especially 10 to 25 $\mu$m. If this thickness is lower than the above-mentioned range, the protecting effect on the aluminum foil is insufficient. On the other hand, if the thickness is above the defined range, flexibility and pliability as the packing material tends to be reduced, and the cost is disadvantageous.

[Inorganic Vapor-Deposited Plastic Films]

In the present invention, in place of the combination of the aluminum foil and the stretched film, the inorganic vapor-deposited plastic films may be used. The inorganic vapor-deposited plastic films are obtained by vapor-depositing an inorganic material such as silicon oxide and ceramics such as alumina on the surface of a plastic film base by a vacuum depositing method, a sputtering method and an ion plating method. The thickness of the vapor-deposited layer is as small as 50 to 1000 Å, but it shows excellent oxygen shutting off properties.

Preferable examples of the plastic film base which may be used include an oriented nylon film as mentioned above, and an oriented polyester film. But stretched polypropylene films may also be used.

The thickness of the inorganic vapor-deposited plastic film may range from 5 to 50 $\mu$m, especially from 10 to 30 $\mu$m, because it is advantageous in respect of handling.

The laminated body used as the packing material in this invention may be produced by producing a pre-laminated product from a polyolefin inner-surface material an oxygen-absorbing agent layer composed of a polyolefin and an iron type oxygen absorbing agent/polyolefin buffering layer, and conjugating this laminated product with (1) a laminated body-composed of aluminum foil and a oriented nylon/or polyester or (2) an inorganic vapor-deposited plastic film, so that the buffering layer and the aluminum foil laminated body, or the inorganic vapor-deposited layer may be opposed.

When the plastic film base of the inorganic vapor-deposited plastic film (base film) is composed of a polyester, an oriented nylon is provided between the buffering layer and the inorganic vapor-deposited layer of the inorganic vapor-deposited plastic film. This is especially preferred in increasing the pinhole resistance.

Preferably, the pre-laminated body is produced by coextrusion. The number of extruders used correspond to the kind of resins, and the corresponding resins are extruded in an overlapping position in a multiple layer and a plurality of dies. Film formation may be carried out by using an inflation film-making method or a T-die film-making method. In the case of the former, a ring die is used, and in the case of the latter, a flat die is used.

In film-making, a multiple film may be stretched of course.

The thickness if the three-layer film may preferably range from 30 to 300 $\mu$m.

When a combination of the aluminum foil and the oriented film is used, the aluminum foil and the oriented film are pasted together in advance by using an adhesive agent, and the resulting pasted product may be pasted by using the pre-laminated body and the adhesive agent. Or the aluminum foil and the drawn film may be pasted sequentially to the pre-laminated body.

When the inorganic vapor-deposited plastic film is used, the inorganic vapor-deposited film may be pasted to the pre-laminated body by using the adhesive agent.

The so-called dry lamination may be used in the adhesive lamination. For this object, a thermosetting adhesive resin of the isocyanate type or the epoxy type may preferably be used.

Of course, one or a combination of at least two types of adhesive agents composed of thermoplastc resins cited above adhesive resins may be used.

The laminated body may be produced also by an extrusion coating method. Speaking concretely, the pre-laminated body is melt-extruded onto (1) a laminated body of an aluminum foil and a oriented nylon and/or a polyester or (2) an inorganic vapor-deposited plastic film thereby to form a final laminated body. In the extrusion coating step, an anchor agent such as a urethane type or titanate type agent may be applied to increase adhesiveness. As required, the above adhesive resin layer may be provided on the aluminum foil.

The packing material of this invention may be used as containers such as various packing bags or flexible closure materials as soft packing materials. Examples of the packing materials include three corner or four corner sealed ordinary pouches, gusset bags, standing pouches and pillow packing cases. These examples are not limited. The closure materials include sealing closures for containers such as cups and trays.

The packing materials of this invention are useful for sealing and preserving foods whose flavor retention and color retention are important. For example, the packing materials of this invention are useful for preservation of foods which can be exemplified as follows. Examples include foods based on tomato, processed foods such as soup, stew and curry, table luxuries such as coffee and tea, fruitage such as fruits, juices and fruit juice products, meat products such as salami sausage and ham, processed marine products such as oil-steeped tuna, eels split and broiled in soy and boiled fish paste, and foods containing functional components such as EPA and DHA.

These packing materials of this invention are effective for preserving medicines and cosmetics susceptible to oxidative degradation and pollution with microorganisms, such as amino acid preparations, fatty emulsifiers, dopamine hydrochloride-incorporated improver for the insufficiency of circulation and vitamine-incorporated packing material.

At the time of packing contents in a container containing the oxygen-absorbing packing material of this invention, a gas substituted packing technology using inert gas such as nitrogen gas is conjointly applied whereby a further effect may be obtained.

EXAMPLES

The invention will be further described by way of Examples. In the following Examples, measurements were taken in a manner as described below.

[Apparent Density]

Measured in compliance with JIS K 6721 maintaining a gap of 38 mm between the flow-out stopper of the funnel and the receiving unit. The receiving unit is of a cylindrical shape having a content of 5 cm³. A sample to be measured is poured into the funnel and is stopped immediately after the receiving unit is filled with the sample and the sample starts over-flowing. The powder swelling on the receiving unit is flatly scraped off along the upper end of the receiving unit using a spatula paying attention so as not to give vibration thereto. The powder adhered on the outer side of the receiving unit is mildly removed, and the powder is weighed by weighing the weight of the cup.

[Packed Apparent Density and Degree of Compression]

The receiving unit is filled with the powder up to its upper end like the case of measuring the apparent density. The receiving unit filled with the powder is horizontally raised by 3 cm and is allowed to fall. This operation is repeated 30 times, and the powder is further poured into space formed at the upper end of the receiving unit as the powder is compressed. The receiving unit is similarly allowed to fall another 30 times to compress the powder. The powder is poured into space formed in the receiving unit, and the receiving unit is allowed to fall another 6 times. Finally, the upper end is flatly scraped off, and the receiving unit is accurately weighed to find a packed apparent density.

The compression degree is calculated in compliance with the following formula, $$\frac{\text{(Packed apparent density)} - \text{(apparent density)}}{\text{(Packed apparent density)}} \times 100(\%)$$

[Specific Surface Area]

Measured in compliance with the BET one-point method. The measuring device is of the Shimazu Flow-sorb type.

[Particle Diameter]

Measured in compliance with the laser diffraction-scattering method. The measuring device is a particle diameter distribution measuring device of the Shimazu laser diffraction type, SALD1100, and ethanol is used as a dispersion medium for the particles. Fifty-percent particle diameter is regarded to be an average particle diameter.

[Aspect Ratio]

The oxygen-absorbing agent particles are expanded into 250 times, photographed, and the aspect ratio is found from the formula R=b/a wherein a denotes the length of the longest axis of the particle and b denotes the length of an axis that intersects the middle point of the long axis at right angles.

Example 1

A 4-kind 6-layer sheet was prepared by co-extruding an inner layer and an outer layer of a propylene/ethylene block copolymer (grade name; EC9J) produced by Mitsubishi Kagaku Co., a first intermediate layer of an ethylene-vinyl alcohol copolymer (grade name; EP-T101A) produced by Kurarey Co., a second intermediate layer of a resin composition in which a resin matrix was comprised of a resin blended with 25 parts by weight of an ethylene-α-olefin copolymer (grade name; Toughmer P-0680) produced by Mitsui Sekiyu Kagaku Kogyo Co. per 100 parts by weight of a propylene-ethylene random copolymer (grade name; EX8) produced by Mitsubishi Kagaku Co., and further containing 30 parts by weight of an iron-type deoxidant (hereinafter referred to as blended iron-type deoxidant) of a blend of a reducing iron powder and a sodium chloride powder per 100 parts by weight of the matrix, and the adhesive resin layers among the ethylene-vinyl alcohol copolymer and the neighboring layers. FIG. 2 shows the constitution of layers and Table 1 shows the constitution of thicknesses. The polypropylene resin forming the inner layer was blended with 12% by weight of titanium oxide and the polypropylene resin forming the outer layer was blended with 6% by weight of titanium oxide in order to conceal black color of the iron-type deoxidant.

By using a vacuum molding machine manufactured by Yamazaki Kanagata Co., the above multi-layer sheet was vacuum-molded into a container having a volume of 110 ml and a surface area of 120 cm² in such a manner that the second intermediate layer faced the inner side. The container was filled with 5 ml of water and was sealed and was preserved in a constant-temperature constant-humidity vessel maintained at-a temperature of 30° C. and a relative humidity of 80% RH for 6 months in order to oxidize the iron-type deoxidant in the container wall.

After preservation, the sectional wall of the container was observed through a scanning-type electron microscope JSM-6300F manufactured by Nippon Denshi Co., and it was learned that tiny peelings took place in many number in a stratified form among the interfaces in the second intermediate layer in cross section.

After preservation, furthermore, the inner surface of the container was evaluated for its ruggedness by ten panelists to evaluate the appearance of the container. The evaluation was based on five steps of from evaluation 1 (not acceptable) to evaluation 5 (excellent). The average values are shown in Table 2, and evaluations of 3 or higher are regarded to be favorable appearances. The results are shown in Table 2. The inner surface of the container was smooth even after preserved for six months, and favorable appearance was maintained.

Example

A multi-layer sheet was prepared quite in the same manner as in Example 1 but changing the resin composition of the second intermediate layer into the one in which the resin matrix was comprised of a resin blended with 25 parts by weight of a low-density polyethylene (grade name; HE30) produced by Mitsubishi Kagaku Co. per 100 parts by weight of a propylene-ethylene random copolymer (grade name; EX8) produced by Mitsubishi Kagaku Co., and further containing 30 parts by weight of a blended iron-type deoxidant per 100 parts by weight of the resin matrix. A container was formed and preserved, and the sectional surface of the container wall was observed and the appearance of the container was evaluated. As a result of observing the sectional area of the container wall, many tiny peelings were observed in a stratified form in the interfaces in the second intermediate layer in cross section like in Example 1. The result of appearance is shown in Table 2. Even after preserved for six months, the inner surface of the container was smooth and favorable appearance was maintained.

Example 3

A multi-layer sheet was prepared quite in the same manner as in Example 1 but changing the resin composition of the second intermediate layer into the one in which the resin matrix was comprised of a resin blended with 25 parts by weight of an ethylene-vinyl acetate copolymer (grade name; LV420) produced by Mitsubishi Kagaku Co. per 100 parts by weight of a propylene-ethylene random copolymer (grade name; EX8) produced by Mitsubishi Kagaku Co., and further containing 30 parts by weight of a blended iron-type deoxidant per 100 parts by weight of the resin matrix. A container was formed and preserved, and the sectional surface of the container wall was observed and the appearance of the container was evaluated. As a result of observing the sectional area of the container wall, many tiny peelings were observed in a stratified form in the interfaces in the second intermediate layer in cross section like in Example 1. The result of appearance is shown in Table 2. Even after preserved for six months, the inner surface of the container was smooth and favorable appearance was maintained.

Example 4

A multi-layer sheet was prepared quite in the same manner as in Example 1 but changing the resin composition of the second intermediate layer into the one in which the resin matrix was comprised of a resin blended with 25 parts by weight of an ionomer (grade name; Himilan 1707) produced by Mitsui-Du Pont Polychemical Co. per 100 parts by weight of a propylene-ethylene random copolymer (grade name; EX8) produced by Mitsubishi Kagaku Co., and further containing 30 parts by weight of a blended iron-type deoxidant per 100 parts by weight of the resin matrix. A container was formed and preserved, and the sectional surface of the container wall was observed and the appearance of the container was evaluated. As a result of observing the sectional area of the container wall, many tiny peelings were observed in a stratified form in the interfaces in the second intermediate layer in cross section like in Example 1. The result of appearance is shown in Table 2. Even after preserved for six months, the inner surface of the container maintained favorable appearance.

Comparative Example 1

A multi-layer sheet was prepared quite in the same manner as in Example 1 but changing the resin composition of the second intermediate layer into the one containing 30 parts by weight of a blended iron-type deoxidant per 100 parts by weight of a propylene-ethylene random copolymer (grade name: EX8) produced by Mitsubishi Kagaku Co. A container was formed and preserved, and the sectional surface of the container wall was observed and the appearance of the container was evaluated. As a result of observing the sectional area of the container wall, the oxygen-absorbing agent had been swollen in the second intermediate layer in cross section, resulting in the occurrence of ruggedness on the surface of the container. The appearance was deteriorated as shown in Table 2.

TABLE 1

|  | Thickness of the layer ($\mu$m) |
| --- | --- |
| Inner layer | 70 |
| Second intermediate layer | 100 |
| Adhesive layer | 10 |
| First intermediate layer | 30 |
| Adhesive layer | 10 |
| Outer layer | 280 |

TABLE 2

|  | Evaluation of appearance |
| --- | --- |
| Example 1 | 4.7 |
| Example 2 | 4.5 |

TABLE 2-continued

|  | Evaluation of appearance |
| --- | --- |
| Example 3 | 3.9 |
| Example 4 | 3.7 |
| Comparative Example 1 | 2.5 |

Example 5

100 Parts by weight of a reducing iron powder produced from an iron ore and granulated to 2.4 mm to 12 mm and 2 parts of sodium chloride (NaCl) having an average particle diameter of 20 $\mu$m were introduced in a total amount of 1.5 kg into a vibration mill of a capacity of 3.0 liters together with steel balls, and were vibration-milled for 3 hours thereby to rub NaCl onto the surfaces of the iron powder. After the operation was finished, the NaCl powder could no longer be confirmed by eyes. The thus prepared NaCl-adhered iron powder (hereinafter referred to as adhered adsorbing agent) possessed a specific area of 1.8 m$^2$/g, an apparent density of 1.7 g/cm$^3$ and an average particle diameter of 28 $\mu$m. A polypropylene (PP) having an MI of 0.6 (g/10 min, 230° C.) blended with 30% by weight of the adhered absorbing agent was pelletized.

A 2-kind 3-layer sheet (having a total thickness of 210 $\mu$m, constitution ratio of white PP:PP:white PP=1:1:1) was prepared having an intermediate layer of a polypropylene (PO) blended with the adhered absorbing agent and inner and outer layers of a white PP obtained by blending a PP having an MI of 0.6 with 8% by weight of titanium white, by using a molding apparatus comprising an inner layer extruder, an outer layer extruder, an intermediate layer extruder, a feed block, a T-die, a cooling roll and a sheet take-up device.

100 Parts by weight of a reducing iron powder that has been milled to possess a specific surface area of 2.4 m$^2$/g and an apparent density of 1.9 g/cm$^3$ and 2 parts of NaCl were introduced into a V-type mixer and were blended together for 30 minutes to prepare an absorbing agent. The PP blended with this absorbing agent was pelletized to prepare a 2-kind 3-layer sheet in the same manner as described above (comparative example 5).

Test pieces (30×30 mm) prepared from these sheets were introduced into a gas-impermeable cup (having a volume of 85 ml) together with 1 ml of distilled water, and were heat-sealed with a heat-sealing closure member made of a gas-impermeable aluminum foil-laminated film, and were preserved at 50° C. After preserved for a predetermined period of time, the oxygen concentration in the container was measured, the oxygen-absorbing amounts of the sheets were found, and the appearance of the sheet pieces was observed. As shown in Table 3, the sheets exhibited increased oxygen-absorbing rates without any change in the appearance.

TABLE 3

|  | Amount of absorbing oxygen (cc/cm$^2$) | | | |
| --- | --- | --- | --- | --- |
|  | 1 day | 3 days | 7 days | Appearance |
| Example 5 | 0.08 | 0.14 | 0.15 | no change |
| Comparative Example 5 | 0.01 | 0.03 | 0.04 | rugged |

Example 6

A 4-kind 6-layer sheet (having a total thickness of 0.8 mm, a constitution ratio of PP/ADH/EVOH/ADH/PO/PP=

40/1/10/1/20/10) was formed having a first intermediate layer of polypropylene pellets (PO) blended with an adhered absorbing agent having a specific surface area of 1.8 m$^2$/g and an apparent density of 1.7 g/cm$^3$, a second intermediate layer of an ethylene-vinyl alcohol copolymer (EVOH: ethyl content of 32 mol %, saponification degree of 99.6 mol %), an inner layer and an outer layer of a white PP obtained by mixing a titanium white pigment into a PP having a melt index (MI) of 0.5 g/10 min (230° C.), and adhesive layers of a maleic anhydride-modified PP (ADH) having an MI of 1.0 g/10 min (230° C.). The obtained sheet was heated at 190° C. and was formed into a square cup having a depth of 30 mm and a volume of 115 ml in a manner that the PO layer was on the inside of the EVOH layer by using a vacuum molding machine. The cup was filled with 1 ml of water and was heat-sealed with a gas-impermeable aluminum foil-laminated closure member in a nitrogen atmosphere. After retort sterilization at 120° C. for 30 kit minutes, the cup was preserved in an atmosphere maintained at 30° C. and 80% RH, and the oxygen concentration in the container was measured after every passage of a predetermined period of time.

As a comparative product, 100 parts of reducing iron that is suitably granulated and 2 parts of NaCl having an average particle diameter of 20 μm were introduced into the same vibration mill as that of Example 5 to prepare an adhered oxygen-absorbing agent having a final shape of a specific surface area of 0.4 m$^2$/g and an apparent density of 2.45 g/cm$^3$. The same cup was formed by using the same molding machine as used in this Example, preserved in the same manner, and the oxygen concentration in the container was measured after every passage of a predetermined period of time (Comparative Example 6-1).

The results were as shown in Table 4. Furthermore, the same cup was formed by using the same sheet but using PP instead of PO, and the preservation testing was conducted (Comparative Example 6-2).

TABLE 4

Results (oxygen-barrier property of the container)

| | Oxygen concentration (%) in the container | | | | | |
|---|---|---|---|---|---|---|
| | Immediately after retorting | 1 W | 2 W | 1 M | 2 M | 3 M |
| Example 6 | 0.08 | 0.11 | 0.16 | 0.16 | 0.30 | 0.42 |
| Comparative Example 6-1 | 0.08 | 0.16 | 0.39 | 0.40 | 0.71 | 0.95 |
| Comparative Example 6-2 | 0.29 | 0.84 | 1.45 | 1.94 | 3.02 | 3.58 |

Example 7

In the product of Example 5 of the invention, not less than 60% of the particles have an aspect ratio of from 0.25 to 0.60. Furthermore, the adhered absorbing agent has an apparent density of 1.7 g/cm$^3$ but a packed apparent density of 2.8 and a compression degree of (1−1.7/2.8)×100=39%. By using this adhered absorbing agent, a 4-kind 6-layer sheet of Example 6 was prepared.

To the reducing iron powder milled into a particle diameter of 40 μm was sprayed an NaCl aqueous solution such that the ratio of iron and NaCl was 100:2. Then, the water was removed to obtain an adhered absorbing agent. The adsorbed absorbing agent exhibited a large apparent aspect ratio, and in which larger than 60% of the particles exhibited an apparent aspect ratio of not smaller than 0.6. By using this adhered absorbing agent, a 4-kind 6-layer sheet of Example 6 was formed (Comparative Example 7-1).

Cups of the same shape as that of Example 6 formed by using these sheets were filled with 1 ml of distilled water and were sealed in a nitrogen atmosphere. The retort sterilization was effected at 120° C. for 30 minutes to observe the oxygen concentration in the containers and the interior of the containers. The product of the invention exhibited excellent effect for suppressing the oxygen concentration in the container compared with that of the comparative product, and further exhibited excellent appearance.

As a Comparative Example 7-2, furthermore, a cup of the same constitution was prepared by using, as a starting material, an oxygen-absorbing agent which has an apparent aspect ratio comparable to that of the product of the invention but to which was adhered no NaCl that is a reaction promoting agent. A cup (Comparative Example 7-3) prepared by using, as a starting material, an absorbing agent obtained by blending an iron powder having an aspect ratio comparable to that of the Comparative Example 7-1, was similarly sterilization-treated, and the oxygen concentration inside therein and the appearance were inspected. The results were as shown in Table 5.

TABLE 5

| | Oxygen concentration (%) in the container | | | | | Appearance evaluation (5 steps) |
|---|---|---|---|---|---|---|
| | Immediately after | 1 W | 2 W | 1 M | 3 M | |
| Example 7 | 0.08 | 0.11 | 0.16 | 0.16 | 0.42 | 5 (good) |
| Comp. Ex. 7-1 | 0.08 | 0.15 | 0.24 | 0.34 | 0.76 | 3 |
| Comp. Ex. 7-2 | 0.08 | 0.14 | 0.23 | 0.40 | 0.95 | 1 |
| Comp. Ex. 7-3 | 0.08 | 0.16 | 0.39 | 0.40 | 1.20 | 1 (poor) |

Example 8

A sheet of Example 5 was prepared by using an oxygen-absorbing agent obtained by introducing an iron powder and sodium chloride (NaCl) into a vibration mill in the same manner as in Example 5, and an iron powder granulated in the same shape as the oxygen-absorbing agent of Example 5 and to which has been sprayed an aqueous solution containing 20% of NaCl at a rate of 10 ml per 100 g of iron, followed by drying. After preserved for one day under the conditions of 50° C. and 100% RH, the amount of absorbing oxygen of the sheet was measured. Both exhibited good oxygen-absorbing performance owing to the presence of the reaction promoting agent adhered to the surfaces of the iron powder, but the one obtained by the dry type method as in Example 5 exhibited an oxygen-absorbing amount of 0.11 cc/cm$^2$ and the one obtained by the wet type method using the aqueous solution of the 35 reaction promoting agent exhibited an oxygen-absorbing amount of 0.07 cc/cm$^2$.

Example 9

A polypropylene having an MI of 0.6 (g/10 min, 230° C.) was blended with 30% by weight of the oxygen-absorbing agent coated with the oxidation promoting agent prepared in Example 5, and was pelletized. Similarly, furthermore, a blend of a polypropylene having an MI of 0.6 and a low-density polyethylene (LDPE) having an MI of 0.5 at a ratio of 9:1, was pelletized. By using these pellets, 3-layer sheets of Example 5 were prepared (Examples 9-1, 9-2) and were heat-sterilized at 120° C. for 30 minutes.

Furthermore, a 3-layer sheet (Comparative Example 9-1) same as that of Example 5 prepared by using pellets of a mixture of PP having an MI of 0.6 and an oxygen-absorbing agent blended with the oxidation promoting agent used in the comparative product 1 of Example 1, and a 3-layer sheet (Comparative Example 9-2) prepared by using pellets of a mixture of PP having an MI of 0.6 and an LDPE having an MI of 0.5 (g/10 min, 190° C.), were heat-sterilized at 120° C. for 30 minutes to examine a change in the appearance.

Properties were evaluated relying upon the method of measuring the amount of absorbing oxygen used in Example 5. The results were as shown in Table 6. As will be obvious from the results, use of a resin system of a mixture of PP with LDPE makes it possible to enhance the appearance as well as the oxygen-absorbing performance.

TABLE 6

|  | Evaluation of appearance (5 steps) | Oxygen-absorbing ability (cc/cm$^2$) |
|---|---|---|
| Example 9-1 | 4 | 0.09 |
| Example 9-2 | 5 | 0.11 |
| Comparative Example 9-1 | 1 | 0.01 |
| Comparative Example 9-2 | 3 | 0.02 |

Excellent 5 ←→ Poor 1

Example 10

A 4-kind 6-layer cup of Example 6 was prepared by using an oxygen-absorbing resin composition which was the product of the invention of Example 5. This cup was filled with 50 ml of distilled water, sealed under atmospheric pressure, heat-sterilized at 120° C. for 30 minutes, and was then preserved at 30° C. and 80% RH.

The test was also conducted by using a similar cup (Comparative Example 10) prepared by using pellets of iron and NaCl-blended oxygen-absorbing agent used in Comparative Example 5 in Example 5.

The product of the invention exhibited no change in the appearance of the container over extended periods of time, but the Comparative Example 10 developed tiny cracks in the inner surface of the container.

According to the present invention, the thermoplastic resin in which will be dispersed the oxygen-absorbing agent is formed of a blend of a plurality of substantially incompatible thermoplastic resins or elastomers, so that the incompatible thermoplastic resins or elastomers form a nonuniformly distributed structure and, particularly, a multi-layer structure in the matrix. In this matrix structure, therefore, when the volumes of the particles comprising the oxygen-absorbing agent or the oxidized product thereof are swollen, the interfaces are peeled off in the nonuniformly distributed structure and, particularly, in the multi-layer structure and tiny voids (gaps) develop among the interfaces. Accordingly, the swollen volumes of the particles comprising the oxygen-absorbing agent or the oxidized product thereof are absorbed by the tiny voids, and the resin coating layers are prevented from being broken.

Thus, the present invention eliminates defects inherent in the conventional oxygen-absorbing multi-layer plastic containers, suppresses a drop in the flavor-retaining property caused by the elution of the oxygen-absorbing agent or the oxidized product thereof, and maintains the content-preserving property and the flavor-retaining property for extended periods of time.

According to the preferred embodiment of the present invention, furthermore, the thermoplastic resin is blended with an oxygen-absorbing agent particles which comprise a reducing iron powder and a layer of an oxidation promoting agent or a catalyst firmly adhered to the surfaces of the reducing iron powder, and having a predetermined specific surface area and an apparent density. It is thus made possible to provide a resin composition containing an oxygen-absorbing agent featuring an enhanced oxygen-absorbing rate, without developing ruggedness after preserved for extended periods of time or after heat-sterilization, and exhibiting excellent appearance, as well as to provide packaging containers.

Example 11, Comparative Example 10

An oxygen-absorbing agent prepared by blending a reducing iron powder and sodium chloride at a weight ratio of 100:2 was compounded into a resin composition in an amount of 25 parts by weight per 100 parts by weight of the resin composition (Here, the resin composition was composed of a propylene-ethylene random copolymer (melt index (MI) of 10 (g/10 min.,230° C.)) and an ethylene-propylene rubber (MI of 4.5 (g/10 min., 190° C.)) at a weight ratio of 7:3) to prepare an oxygen-absorbing resin composition. This oxygen-absorbing resin composition was melt-extruded by an extruder, and was hot-cut to prepare a prescribed quantity (about 0.3 g) of the oxygen-absorbing composition. The quantity of the oxygen-absorbing resin composition was put into a coated crown shell pre-heated, and was immediately pressed with a press-mold in order to form a liner in the crown shell. A glass bottle having a capacity of about 500 ml was filled in a full level with a distilled water dissolving an oxygen in an amount of 200 ppb and then was stoppered with the crown. The stoppered bottle was stored at room temperature, and the amount of the oxygen dissolving in the water was measured after a predetermined period of time had passed.

In Comparative Example 10, a crown prepared in the same way as in Example 11 above-mentioned, except that the used resin composition was not compounded with the oxygen-absorbing agent.

In Example 11 of the present invention, when the period of time for storing had passed, the amount of the oxygen dissolving in the water decreased. On the other hand, in Comparative Example 10, when the period of time for storing had passed, the amount of the oxygen dissolving in the water increased due to penetrating of oxygen through the crown.

The results are shown in Table 7.

TABLE 7

| | Amount of oxygen dissolving (ppb) | | | | |
|---|---|---|---|---|---|
| | initial | 1 week | 2 weeks | 1 month | 3 months |
| Example 11 | 200 | 120 | 100 | 95 | 90 |
| Comparative Example 10 | 200 | 250 | 300 | 450 | 500 |

Example 12, Comparative Example 11

An oxygen-absorbing agent was prepared by vibration-pulverizing a reducing iron powder and sodium chloride at a weight ratio of 100:2 in a vibration mill for 3 hours. The obtained oxygen-absorbing agent was compounded into a resin composition in an amount of 30 parts by weight per 100 parts by weight of the resin composition (Here, the resin composition was composed of a propylene-ethylene random copolymer (melt index (MI) of 10 (g/10 min., 230° C.)) and an ethylene/a-otefin copolymer (MI of 10 (g/10 min., 190° C.)) at a weight ratio of 4:1) to prepare an oxygen-absorbing resin composition. This oxygen-absorbing resin composition, a hydrogenated styrene-butadiene block copolymer and a liquid paraffin were blended at a weight ratio of 45:20:35 to prepare a blended material. The blended material was melt-extruded by an extruder, and was hot-cut to prepare a prescribed quantity (about 1.2 g) of the blened material. The quantity of the blended material was put into a coated pilfer proof cap shell (made of aluminum, 38 mm diameter) pre-heated, and was immediately pressed with a press-mold in order to form a liner in the cap shell. And then, a mall quantity of a linear low density polyethylene (LLDPE) was extruded onto the liner, and was pressed in the same way as the above in order to form a coating of 10 μm in thickness on the liner. A glass bottle having a capacity of about 1000 ml was filled with an ascorbic acid water solution so that the head space volume in the bottle is 25 ml, and then was stoppered by making the cap wind the bottle. The stoppered bottle was stored at room temperature, and the concentration of the oxygen in the head space was measured after a predetermined period of time had passed.

In Comparative Example 11, a cap prepared in the same way as in Example 12 above-mentioned, except that the used blended material did not comprise the oxygen-absorbing agent.

In Example 12 of the present invention, the rate of oxygen concentration decreasing was large, and the appearance of the liner was not changed, and iron dissolution did not occur.

The results are shown in Table 8.

TABLE 8

| | Oxygen concentration (%) | | | |
|---|---|---|---|---|
| | initial | 3 days | 1 week | 1 month |
| Example 12 | 20.9 | 11.6 | 3.8 | <0.1 |
| Comparative Example 11 | 20.9 | 16.7 | 11.2 | 3.8 |

Example 13, Comparative Example 12

An oxygen-absorbing agent was prepared by vibration-pulverizing a reducing iron powder and sodium chloride at a weight ratio of 100:2 in a vibration mill for 3 hours. The obtained oxygen-absorbing agent was melt-mixed with a resin composition in an amount of 25 parts by weight per 100 parts by weight of the resin composition (Here, the resin composition was composed of an ethylene/vinylalcohol copolymer (32 mol % of ethylene content, 99.5 mol % of saponification degree) and a low density polyethylene (melt index (MI) of 2.2 (g/10 min.,190° C.)) at a weight ratio of 4:1) to prepare an oxygen-absorbing resin composition. A two-kinds-three-layers plastic cap having a mouth diameter of 38 mm was prepared by pressure-molding (The layer structure of the plastic cap: The outer and inner layers were made of a white polypropylene prepared by compounding 8% by weight of titanium oxide into a polypropylene (melt index (MI) of 0.6 (g/10 min.,230° C.). The intermediate layer was made of the oxygen-absorbing resin composition.) A liner composed of a polypropylene, an ethylene-propylene rubber and a filler was provided in the cap. A glass bottle having a capacity of 500 ml was filled with a distilled water dissolving an oxygen in an amount of 200 ppb so that the head space volume in the bottle was not left.

In Comparative Example 12, a plastic cap composed of polypropylene was used.

In Example 13 of the present invention, the increase of the oxygen dissolving amount was not found after 3 months of storage period under 20° C., 60% RH had passed, though in Comparative Example 12, the oxygen dissolving amount remarkably increased.

Example 14

An oxygen-absorbing composition (PO) was prepared by compounding an iron-type oxygen-absorbing agent having 20 μm of average particle diameter into a polypropylene resin (PP) having a melt index (MI) of 2.5 (g/10 min.,230° C.) in an amount of 10 parts by weight per 100 parts by weight of the resin. A film of three-layers structure, in which the intermediate layer was made of the oxygen-absorbing composition and both layers in both sides of the intermediate layer were made of the same PP as the above, was prepared by inflation method. At this time, since the PP layer in the one side was compounded with a titanium oxide pigment to be whitened, the layer structure of the film was: white PP layer/PO layer/PP layer=20/25/20 (μm). Furthermore, an aluminum foil of 7 μm thickness and polyethylene terephthalate (PET) film of 12 μm thickness were laminated on the side of the PP layer by using an adhesive to prepare an oxygen-absorbing laminate film (Present invention 1) having the layer structure of: white PP/PO/PP/adhesive/Al/adhesive/PET. Furthermore, another oxygen-absorbing laminate film (Present invention 2) was prepared by using an aluminum oxide vapor deposited PET film, instead of Al/adhesive/PET film.

As the comparisons, laminate films were prepared in the same way as of Present invention 1 and Present invention 2, except that the laminate films do not have the PO layer (Comparison 1, Comparison 2). Furthermore, a laminate film (Comparison 3) was prepared in the same way as of Present invention 1, except that an ethylene vinyl alcohol copolymer (Eval resin, Kurare Co, Ltd.) of an organic barrier film was used instead of the aluminum foil in the present invention 1.

By using these films, three-sides-sealed bags of 150 mm×170 mm were prepared. 200 ml of distilled water was put in these bags, and then the bags were sealed at the rest side so that the space (head space) in the bag was 15 ml. After retort-treating the bags at 120° C., for 30 min. and preserving under 30° C., 80% RH for a predetermined period of time, the oxygen concentration in the bags were measured.

The results of the measurement are shown in Table 9.

TABLE 9

| | (results) | | | | |
|---|---|---|---|---|---|
| | Oxygen concentration (%) in the bag | | | | |
| | immediately after retorting | 14 days | 30 days | 60 days | 180 days |
| Present invention 1 | 6.5 | 0.3 | 0.1 | 0.1 | 0.1 |
| Present invention 2 | 7.0 | 0.5 | 0.2 | 0.1 | 0.1 |
| Comparison 1 | 20.8 | 20.8 | 20.8 | 20.8 | 20.8 |
| Comparison 2 | 20.8 | 20.8 | 20.8 | 20.8 | 20.8 |
| Comparison 3 | 7.2 | 0.9 | 0.3 | 0.1 | 1.2 |

In Comparisons 1 and 2 not having a PO layer, the oxygen concentration in the bags did not change. In Comparison 3, though the oxygen concentration decreased at first, the oxygen concentration increased for a long period of time for preservation.

Example 12

180 g of a sarsa sauce, a beef curry or a coffee prepared by the following recipe was filled in each of the same bag as the present invention 1 in Example 14, and then the filled bag was heat-sealed, so that the air volume remained in the bag was about 15 cc. After sterilizing the bags at 120° C., for 30 min. and preserving under 30° C., 80% RH for a predetermined period of time, the tasting by sense was carried out at the time when 2 weeks and 1 month for preservation had passed. The number of the panelist was 10, and the results were evaluated by numbers up to 5 (point 5 is defined as a perfect score).

The results of the evaluation are shown in Table 10. As a comparison, the same testing was carried out by using the bag having the same structure as of Comparison 1 in Example 14.

TABLE 10

| | (Results of testing by sense) | | | |
|---|---|---|---|---|
| | 2 weeks | | 1 month | |
| | Present invention 1 | Comparison 1 | Present invention 1 | Comparison 1 |
| sarsa sauce | 4.6 | 4.0 | 4.5 | 3.2 |
| beef curry | 4.8 | 4.1 | 4.6 | 3.5 |
| coffee | 4.1 | 3.8 | 3.8 | 3.0 |

In all of the testing, the bag of the present invention exhibited an excellent preservation property.

[Recipe of the contents]
1. Sarsa Sauce

The sarsa sauce was prepared by cutting a pepper, a tomato and an onion into tiny pieces and then adding proper amounts of a table salt, lemon juice and a garlic into the tiny pieces.

2. Coffee

Boiled mineral water was poured into 72 g of a blue mountain coffee ground down to the middle degree in order that the coffee was steamed for 1 minute, and then liquid of coffee was obtained by pouring 1.3 litter of the boiled mineral water.

3. Beef Curry

Middle meats (1.5 cm$^3$) prepared by being roasted and freezed was thawed and heated again. A potato and a carrot prepared by being cut into prescribed sizes and freezed were thawed and put into hot water for a short time. With regards to 100 g of the beef meats, the potato 75 g, the carrot 50 g, an onion 50 g, a curry roux 600 g were mixed to prepare a curry.

Example 13

Present invention 1 and Comparison 1 in Example 14 were used as a heat sealable base material for a steel foil laminate cup with a flange (Hiretoflex, Toyo Seikan Kaisha, Ltd.) containing a pineapple with a sweet liquid of siroop. Sealing was carried out under nitrogen gas atmosphere and the space (head space) in the container was 20 cc. After sterilizing with hot water at 90° C. for 20 minutes and preserving at 30° C., the color of the pineapple was measured at the time when a predetermined period of time had passed. The measurement was carried out by using the Color Machine Type-I manufactured by Suga Testing Machine Co. and color phase (H) was measured. The color phase of the pineapple in Present invention 1 did not change almost as compared with the initial color phase, but the color phase of the pineapple in Comparison 1 was found to change.

The results of the measurement are shown in Table 11.

TABLE 11

| | (Color phase) | | |
|---|---|---|---|
| | Color phase (H) | | |
| | 1 month | 2 months | 3 months |
| Present invention 1 | 100.5 | 100 | 100 |
| Comparison 1 | 97.5 | 96 | 95 |

Example 17

As Compaison 4, a laminate film was prepared in the same way as of Present invention 1 in Example 14, except that the amount of the compounded oxygen absorbing agent in the intermediate layer is 70% of the amount in Present invention 1. Three-sides-sealed bags were prepared from Present invention 1 and Comparison 4. The prepared bags were filled with 180 ml of water, and then were retort-treated at. 120° C., for 30 min. After preserving for 1 month under 30° C., 80% RH, the appearances of the bags were its evaluated and the laminate strengths of the bags were measured. The method for measuring was shown below. The surface of the bag in Present invention 1 was smooth, and the appearance of Present invention 1 was excellent as compared with Comparison 4. The laminate strength of Present invention 1 was 1.0 kg/cm$^2$, whereas the laminate strength of Comparison 4 was 0.2 kg/cm$^2$.

Method for measuring the laminate strength

Instruments: TENSILON (Toyo Baldwin Co., Ltd.)
Sample: Tape-like shape (15 mm width)
Tensing speed: 300 mm/min.
Measuring environment: 23° C., 50% RH Example 18

As Present invention 3, a laminate film was prepared in the same way as of Present invention 1 in Example 14, except that the resin composition of the oxygen-absorbing intermediate layer is a blend of a polypropylene-type resin (melt index (MI) of 1.2 (g/10 min., 230° C.)) and a low density polyethylene (LDPE, MI of 1.0 (g/10 min., 190° C.)) at a weight ratio of 7:3. Three-sides-sealed bag was prepared from Present invention 3. The prepared bag was filled with 180 ml of water, and then was stored at 50° C. for 6 months.

After preserving for 6 months, iron amount in the water was measured by atomic light absorption method. As the result, iron was found not to dissolve into the water in Present invention 3. Furthermore, the bag of Present invention 3 was found to have an excellent durability for container.

Example 19

As Present invention 4, a laminate film was prepared in the same way as of Present invention 1 in Example 14, except that the iron-type oxygen-absorbing agent in the oxygen-absorbing intermediate layer was prepared by adhering sodium chloride onto the surface of the iron particle.

Three-sides-sealed bag was prepared from Present invention 4. The prepared bag was filled with 180 ml of water, and then was tested in the same way as of Example 18. As the result, iron was found not to be detected in the water in the bag of Present invention 4.

According to the present invention, the thermoplastic resin in which the oxygen-absorbing agent will be dispersed is formed of a blendof a plurality of substantially incompatible thermoplastic resins or elastomers, so that the incompatible thermoplastic resins or elastomers form a nonuniformly distributed structure and, particularly, a multi-layer structure in the matrix. In this matrix structure, therefore, in case the particles comprising the oxygen-absorbing agent or the oxidized product thereof undergo expansion, the non-uniformly distributed structure develops peeling on the interfaces of the multi-layer structure and tiny voids (gaps) in the interfaces. Therefore, the expansion of volume of the particles comprising the oxygen-absorbing agent or the oxidized product thereof is absorbedby the tiny voids, and the resin coating layers are prevented from being broken.

In an ordinary state, the gas-barrier resin layer works to prevent the permeation of oxygen, i.e., to shut off oxygen. Under the conditions where the water and heat act simultaneously such as in the sterilization by heat, the oxygen-absorbing agent present in the intermediate resin layer effectively works to shut off oxygen. Thus, the functions are effectively shared depending upon the state where the container is placed. That is, under the conditions where the water and heat act simultaneously, the water permeates conspicuously through the moisture-resistant resin layer and the gas-barrier resin further raises its temperature upon absorbing moisture to lose its oxygen-barrier property. However, the water that is absorbed and the heat that is given activate the oxygen-absorbing agent which, then, effectively traps oxygen, thus eventually suppressing the permeation of oxygen during the sterilization by heat.

By laminating a laminated body of aluminum foil and drawn nylon and/or polyester or the inorganic vapor-deposited plastic film to the outside portion of the oxygen-absorbing laminated body, oxygen permeation from an outside portion can be suppressed almost completely. Under the conditions where water and heat simultaneously act, this oxygen permeation is not reduced. Thus, it becomes possible to obtain a packing material having excellent preservability of the contents after retorting sterization.

Accordingly, the container, the packaging material, the cap, and the liner material of the present invention are useful for a use in which the contents is heated such as sterilized with hot-water, filled during the contents is hot, retort-sterilized, etc. Furthermore, the present invention is useful for a packaging container in which the contents is cooked by micro-wave heating such as a micro-wave oven after the container was opened.

Thus, the present invention eliminates defects inherent in the conventional oxygen-absorbing multi-layer plastic containers, suppresses a drop in the flavor-retaining property caused by the elution of the oxygen-absorbing agent or the oxidized product thereof, and maintains the content-preserving property and the flavor-retaining property for extended periods of time.

According to the preferred embodiment of the present invention, furthermore, the thermoplastic resin is blended with an oxygen-absorbing agent particles which comprise a reducing iron powder and a layer of an oxidation promoting agent or a catalyst firmly adhered to the surfaces of the reducing iron powder, and having a predetermined specific it surface area and an apparent density.

What is claimed is:

1. A thermoplastic resin composition comprising a blend of a plurality of thermoplastic resins and/or elastomers, and oxygen absorbing agent particles dispersed in the thermoplastic resins and/or the elastomers, wherein:
   the plurality of the thermoplastics resins and/or the elastomers are incompatible with each other; and
   the oxygen absorbing agent particles comprise a reducing iron powder and a layer of an oxidation promoter or a catalyst which sticks to the surface of the iron powder, the oxygen absorbent agent particles having an average particle diameter of 10 to 50 $\mu$m as measured by a laser scattering method, and having a flat or spindle-like shape;
   and wherein the oxygen absorbing agent particles have an aspect ratio (short axis/long axis) of 6.0 or below, which are being present in an amount of at least 50%, and have a compression degree of at least 20%.

2. An oxygen-absorbing resin composition according to claim 1, wherein either the incompatible thermoplastic resins and/or the elastomers are propylene polymers (A) and the other ones are ethylene polymers (B), the blend thereof having a weight ration (A:B) of from 100:1 to 1:1.

3. An oxygen-absorbing resin composition according to claim 1 wherein the oxygen absorbing agent is contained in an amount of 1 to 200% by weight based on the blend.

4. An oxygen-absorbing resin composition according to claim 1, wherein the oxygen absorbing agent particles have the oxidation promoter or the catalyst which is present in an amount of 0.1 to 5% by weight of the reducing iron powder, and have a specific surface area of at least 0.5 $m^2$/g and an apparent density of not larger than 2.2 g/cc.

5. An oxygen-absorbing resin composition according to claim 1 wherein the oxygen absorbing agent particle is obtained by dry milling a reducing iron powder and a powder of an oxidation promotor or a catalyst.

6. An oxygen-absorbing resin composition obtained by blending 1 to 200 parts by weight of an oxygen-absorbing agent into 100 parts by weight of a thermoplastic resin, the oxygen-absorbing agent comprising oxygen-absorbing agent particles which comprise a reducing iron powder and an oxidation-promoting agent or a catalyst firmly adhered to surfaces of said reducing iron powder, and which has a specific surface area of not smaller the 9.5 $m^2$/g and an apparent density of not larger than 2.2 g/cc, and in which the oxidation-promoting agent or the catalyst is present in an amount of from 0.1 to 5% by weight per the reducing iron powder, wherein the oxygen absorbing agent particles have an average particle diameter of 10 to 50 $\mu$m as measured by a laser scattering method and an aspect ratio (short axis/long axis size) of 0.6 or below being present in an amount of at least 50 % and is a flat or spindle-shaped particle having a compression degree of at least 20%.

7. An oxygen-absorbing multilayer plastic container molded from a laminated body obtained by laminating a thermoplastic resin layer having no oxygen absorbing agent compounded on both sides of a layer composed of the oxygen-absorbing resin composition according to claim 1.

8. An oxygen-absorbing multilayer plastic cap which is molded from a laminated body obtained by laminating a thermoplastic resin containing no oxygen-absorbing agent on both sides of a layer composed of the oxygen-absorbing resin composition described in claim 1.

9. A liner material for caps which contains a layer composed of the oxygen-absorbing resin composition according to claim 1.

* * * * *

UNITED STATES PATENT AND TRADEMARK OFFICE
CERTIFICATE OF CORRECTION

PATENT NO. : 6,964,796 B1 Page 1 of 1
DATED : November 15, 2005
INVENTOR(S) : Masayasu Koyama et al.

It is certified that error appears in the above-identified patent and that said Letters Patent is hereby corrected as shown below:

Title page,
Item [30], Foreign Application Priority Data, delete "8/275976P" and insert -- 275976/96 --; delete "9/95250" and insert -- 9520/99 --.

Signed and Sealed this

Twenty-first Day of February, 2006

JON W. DUDAS
*Director of the United States Patent and Trademark Office*